US012339868B2

(12) United States Patent
Sanossian

(10) Patent No.: US 12,339,868 B2
(45) Date of Patent: Jun. 24, 2025

(54) DESCRIPTIVE INSIGHT GENERATION AND PRESENTATION SYSTEM

(71) Applicant: Microsoft Technology Licensing, LLC, Redmond, WA (US)

(72) Inventor: Hermineh Sanossian, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 16/871,747

(22) Filed: May 11, 2020

(65) Prior Publication Data

US 2021/0350068 A1      Nov. 11, 2021

(51) Int. Cl.
*G06F 40/186*      (2020.01)
*G06F 16/25*       (2019.01)
(Continued)

(52) U.S. Cl.
CPC .......... *G06F 16/258* (2019.01); *G06F 18/214* (2023.01); *G06F 40/186* (2020.01);
(Continued)

(58) Field of Classification Search
CPC .. G09B 21/001; G09B 21/002; G09B 21/003; G09B 21/004; G09B 21/005;
(Continued)

(56) References Cited

U.S. PATENT DOCUMENTS 5,636,038 A * 6/1997 Lynt .......................... A61F 9/08
345/110
8,086,462 B1    12/2011 Alonso et al.
(Continued)

FOREIGN PATENT DOCUMENTS

WO      WO-2017119006 A1 *   7/2017    ............. G06N 20/00

OTHER PUBLICATIONS

Obeid, Jason; Chart to Text Generating Natural Language Description for Charts by Transformer Model; p. 1-10 (Year: 2020).*
(Continued)

*Primary Examiner* — Stephen S Hong
*Assistant Examiner* — Carl E Barnes, Jr.

(57) ABSTRACT

A system is described that generates descriptive insights in a manner that does not require observations to be made by a visually-impaired user and that can present insights in a form perceptible by such a user. A structured dataset or a digital visual graph may include business intelligence or other types of data. In the case of a graph, the graph is converted to the structured dataset. Parameter names in the dataset are encoded using parameter metadata. Relationships among the data of the dataset are identified based on the encoded parameter names and content of the parameters. The relationships are evaluated based on domain knowledge to generate insights. The insights are applied to automatically-selected text templates to generate descriptive insights. The descriptive insights may be presented to a user in a user interface (e.g., in a BI dashboard) or converted to a form perceptible by a visually-impaired user (e.g., speech).

20 Claims, 9 Drawing Sheets

(51) Int. Cl.
  *G06F 18/214* (2023.01)
  *G06K 9/00* (2022.01)
  *G06K 9/62* (2022.01)
  *G06Q 10/06* (2023.01)
  *G06Q 10/063* (2023.01)
  *G09B 21/00* (2006.01)
(52) U.S. Cl.
  CPC ......... *G06Q 10/063* (2013.01); *G09B 21/001* (2013.01); *G09B 21/003* (2013.01); *G09B 21/006* (2013.01)
(58) Field of Classification Search
  CPC .. G09B 21/006; G09B 21/007; G09B 21/008; G09B 21/009; G06F 40/186; G06F 16/268; G06F 18/214; G06F 16/258; G06K 9/00442; G06K 9/6256; G06Q 10/063; G06V 30/40
  See application file for complete search history.

(56) References Cited

U.S. PATENT DOCUMENTS

| | | | |
|---|---|---|---|
| 8,595,153 B2 | 11/2013 | Drucker et al. | |
| 9,449,062 B2 | 9/2016 | Latzina | |
| 10,366,167 B2* | 7/2019 | Rajendran | G06K 9/00449 |
| 2003/0115080 A1* | 6/2003 | Kasravi | G06Q 10/087 |
| | | | 715/254 |
| 2015/0049951 A1* | 2/2015 | Chaturvedi | G06K 9/00442 |
| | | | 382/190 |
| 2015/0066594 A1* | 3/2015 | Li | G06Q 30/0202 |
| | | | 705/7.31 |
| 2016/0232457 A1 | 8/2016 | Gray et al. | |
| 2017/0185835 A1* | 6/2017 | Appel | G06V 30/422 |
| 2017/0371856 A1* | 12/2017 | Can | G06K 9/3233 |
| 2018/0131803 A1* | 5/2018 | Ellis | G09G 5/005 |
| 2019/0332623 A1* | 10/2019 | Galia | G06F 16/36 |
| 2020/0050946 A1* | 2/2020 | Lecue | G06F 18/22 |
| 2020/0073917 A1* | 3/2020 | Choe | G06F 40/216 |
| 2021/0097232 A1* | 4/2021 | Long | G06F 40/186 |
| 2022/0350816 A1* | 11/2022 | Kim | G06F 16/245 |

OTHER PUBLICATIONS

Al-Zaidy, et al., "Automatic Summary Generation for Scientific Data Charts", In Workshops at the thirtieth AAAI conference on artificial intelligence, Mar. 29, 2016, pp. 658-663.

Deshpande, Jaidev, "Natural Language Generation with Python", Retrieved from: https://in.pycon.org/cfp/2019/proposals/natural-language-generation-with-python~dJole/, Jul. 1, 2019, 4 Pages.

"International Search Report and Written Opinion Issued in PCT Application No. PCT/US2021/028048", Mailed Date: Jul. 9, 2021, 12 Pages.

* cited by examiner

DESCRIPTIVE INSIGHT GENERATION AND PRESENTATION SYSTEM

BACKGROUND

Today's business intelligence tools are designed to collect and make sense of large quantities of data. Business data may be stored in a range of different data stores including data warehouses employing relational databases. The intelligence tools may analyze this information and present it as graphs and tables that can guide users in decision making where data analysts discover patterns in the large quantities of data. Often, user interfaces are designed to allow end users to create their own reports and business intelligence dashboards. In some cases, cloud-based systems provide business analytics services with interactive visualizations and business intelligence capabilities. One such system is Microsoft® Power BI® and Microsoft's Azure cloud platform, which offer data warehouse capabilities including data preparation, data discovery, and interactive dashboards.

As business information flows into these systems from many sources, copious amounts of data may be made available as digital visual graphs or tables of data. Data may be streamed, or displayed as periodic reports (e.g., by the minute, per hour, or per day. For example, users may receive daily batches of information that change relative to the previous day. The users may visually analyze the data for trends and changes over time. Some systems provide business analytics dashboards that present the data in digital visual graphs and/or tables of data. The users may visually analyze the data for anomalies, trends, peaks, comparisons, and other types of changes. The system may enable the users to describe or summarize their observations in the dashboards. For example, a user may enter their analysis as a verbal insight. The user's verbal insight may be displayed in the dashboard as a descriptive report or may be distributed in a descriptive email report to other users. When the incoming data changes over time (e.g., per day), the end user must change or update their summary to convey their analysis of the new data. This process of verbally summarizing daily visual reports may be tedious work for an end user. Moreover, important changes in the data may be overlooked, for example, due to a graph scale being disproportionate relative to the amount of data or the amount of change in the data for a given time.

Furthermore, such conventional systems are not useable by the visually impaired, both because these systems require users to visually analyze the data as noted above, and because the recorded observations are not produced in a form suited for perception by a visually impaired user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided for generating automated descriptive insight reports. In one embodiment, a system includes one or more processors and one or more memory devices. The memory devices store program code to be executed by the one or more processors. The program code includes a digital visual graph to dataset converter that is configured to convert a digital visual graph into a structured dataset having data elements that correspond to the digital visual graph. A parameter attribute detector is configured to detect an attribute for each respective data element of the structured dataset. A data transformer is configured to encode a parameter name for each respective data element of the structured dataset, where each of the encoded parameter names indicates the detected attribute for the respective data element of the structured dataset. A descriptive insight generator is configured to identify relationships among the data elements of the structured dataset based on the encoded parameter name and content of each respective data element of the structured dataset. The descriptive insight generator is configured to evaluate the identified relationships based on domain knowledge and generate descriptive insights for the structured dataset based on the evaluation of the identified relationships. A descriptive insight report generator is configured to generate an automated descriptive insight report for the digital visual graph based on the generated descriptive insights applied to the selected descriptive insight report template. A text converter is configured to convert digital content of the automated descriptive insight report to a form suited for perception by a visually impaired user.

In some embodiments, the digital visual graph to dataset converter includes a trained machine learning model that is configured to identify a type of the digital visual graph. A text extractor is configured to extract text elements in the digital visual graph. A text locator is configured to locate each of the text elements relative to a coordinate system for the digital visual graph. A text recognizer is configured to recognize the text elements. A parameter type identifier is configured to identify a parameter type of each of the text elements. A visual image scanner is configured to scan the digital visual graph horizontally and vertically based on the identified type of the digital visual graph, and measure a magnitude and location of output data illustrated in the digital visual graph relative to the coordinate system. A structured dataset generator is configured to generate the structured dataset by associating the text elements, the location of each of the text elements relative to the coordinate system, the parameter type of each of the text elements, and the magnitude and location of the output data relative to the coordinate system.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
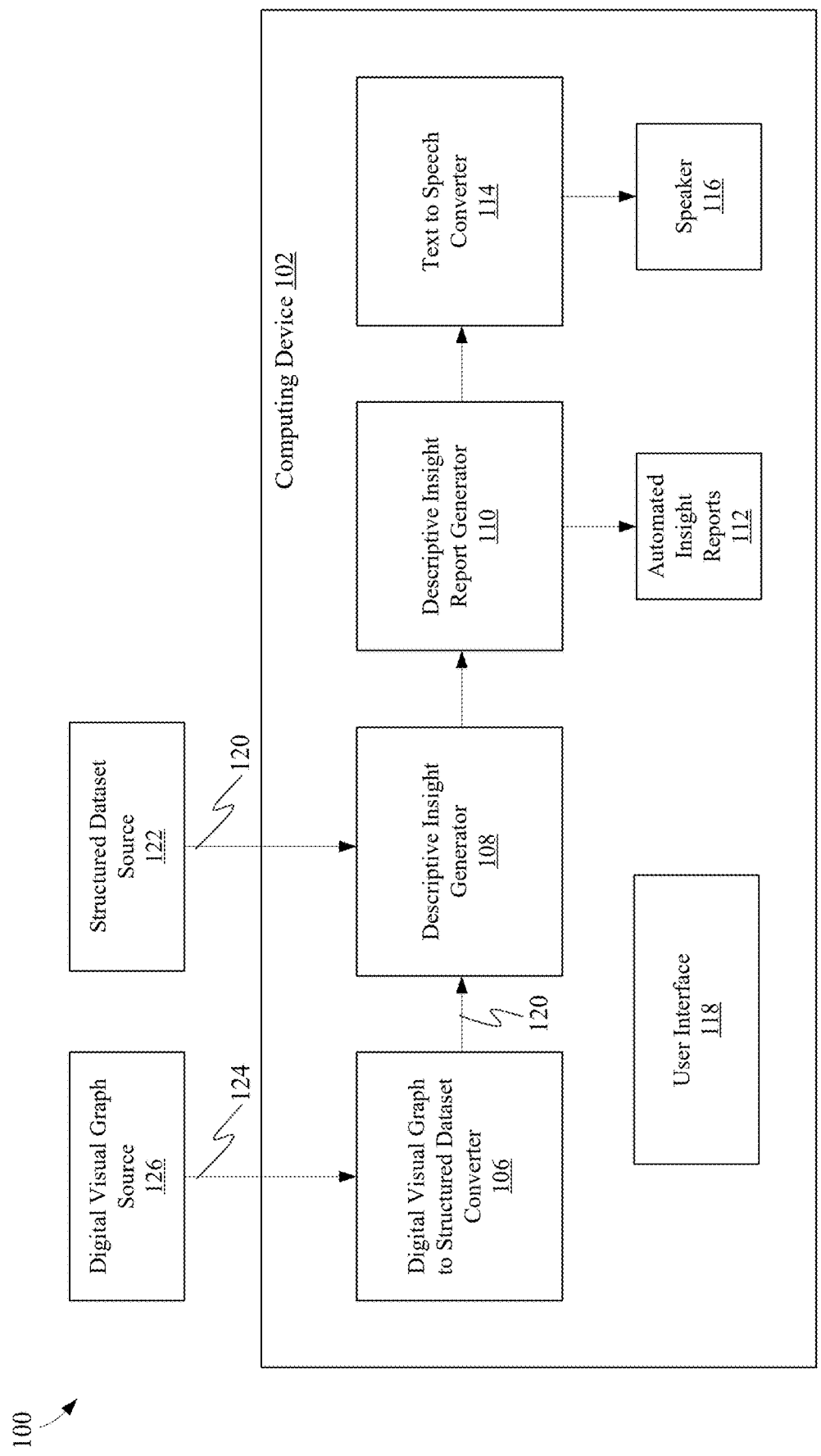
FIG. 1 is a block diagram of a system for generating automated descriptive insights from a digital visual graph or a structured dataset, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Business intelligence tools receive and analyze copious amounts of information and present the information as digital visual graphs and tables in user interfaces such as business data dashboards. In some cases, cloud-based systems provide business analytics services with interactive visualizations and business intelligence capabilities. As described above, one such system is Microsoft® Power BI® and Microsoft's Azure cloud platform, which offer data warehouse capabilities including data preparation, data discovery, and interactive dashboards. Interactive dashboards may enable end users to summarize anomalies and changes they observe in the digital visual data and enter their analysis as verbal insights into the dashboards for display or as email reports. However, when the data changes over time, the end user must change or update their summary in light of the new data and changes in particular output. For example, business data may be received as streams, by the minute, per hour, or per day. Users may summarize anomalies and changes they observe in the dashboards each time the data changes over time.

The present disclosure provides methods and systems for describing data in a textual manner and using statistics to generate further information about the data. For example, the system automatically generates descriptive insights (e.g., verbal or textual analysis of trends, anomalies, peaks, comparisons (e.g., top three outcomes), and other types of patterns in the data) from any received dataset or digital visual graph. The system decides which information to summarize based on artificial intelligence techniques and uses data exploration to find the changes in the data and create the descriptive reports using human like sentences to describe the changes. The system has its own language to differentiate between different types of variables and the importance of such variables. A knowledge base is built to assess the data, such as to identify what constitutes a better or worse result in the data. For example, when the data represents sales, a higher level of the sales is considered a good (or positive) outcome. On the other hand, a higher level of non-detected malware apps would be considered a bad (or negative) outcome.

When the system receives the information in the form of a digital visual graph, the system may convert the digital visual graph to a structured dataset before processing the dataset. For example, a digital visual graph to structured dataset convertor is used to convert a graph to a dataset.

In some embodiments, artificial intelligence techniques may be utilized to generate statistical insights that describe patterns or changes in datasets (e.g., in words or text).

Textual descriptions of the data itself may also be automatically generated by the system. Once the automated descriptive insights are stored in the form of text, the system may use machine learning techniques to select or filter key insights for consumption by a user. For example, the key (filtered) automated descriptive insights may be displayed as text in a business intelligence dashboard. The automated generation of the textual descriptive insights and the filtering process provide for an efficient use of the user interface and other system resources by automatically discarding redundant or uninteresting information and succinctly presenting the most relevant information as text. Furthermore, the user interface is improved by capturing and displaying automated insight descriptions for changes in data that may be overlooked by a user attempting to summarize the data by human observation, for example, due to a graph scale being disproportionate relative to the amount of data or the amount of change in the data.

In some embodiments, the textual descriptions may be converted into another communicative form. For example, the automated descriptive insights may be converted from text to speech and audibly played via a speaker, or converted to a tactile format such as braille, for consumption by a visually impaired user. In another example, the textual automated insights may be automatically translated into one or more different languages for distribution to users of differing countries or regions. Some examples of systems that may utilize the automated descriptive insights or may be sources of graphs or structured data include Power BI®, EXCEL®, or other comma separated value (CSV) dataset sources. For example, automated descriptive insights may be incorporated into Power Bi® and/or may run in AZURE® from AZURE® streams. Also, the automated descriptive insights system may run on a client machine or it can be a cloud service.

Since embodiments described herein can generate descriptive insights based on automated processing of digital visual graphs and structured datasets as well as render such descriptive insights into a form suited for perception by a visually impaired user, such embodiments represent a marked improvement over conventional systems that are not useable by the visually impaired because they (1) require users to visually analyze data to record observations and (2) do not produce the recorded observations in a form suited for perception by a visually impaired user. Thus, embodiments described herein provided an improved user interface to a business intelligence system for visually-impaired users.

Furthermore, since embodiments described herein can generate descriptive insights based on automated processing of digital visual graphs and structured datasets, such embodiments enable the conservation of computing resources (e.g., processor cycles, memory, display, and input/output) that would otherwise be expended in obtaining and recording manually-entered user observations.

A system for automatically generating descriptive insights may be implemented in one or more computing devices. In one example, the system may have a client server architecture and/or a distributed computing architecture that spans multiple devices. In another example, a single computing device may include the entire system for generating and displaying the descriptive insights. Example embodiments for generating automated descriptive insights are described as follows.

FIG. 1 is a block diagram of a system for generating automated descriptive insights from a digital visual graph or a structured dataset, according to an example embodiment. Referring to FIG. 1, a system 100 is shown. System 100 includes a computing device 102, a digital visual graph to structured dataset converter 106 (i.e., graph to dataset converter 106), a descriptive insight generator 108, a descriptive insight report generator 110 (i.e., report generator 110), an automated insight report 112, a text to speech converter 114, a speaker 116, and a user interface 118. Also shown in FIG. 1 are a structured dataset 120, a structured dataset source 122, a digital visual graph 124, and a digital visual graph source 126. It is noted that, in an alternative embodiment, the components of computing device 102 may be distributed across multiple interconnected computing devices.

Structured dataset source 122 may store and/or generate structured dataset 120. Structured dataset 120 may include data elements that are organized in any suitable way. For example, the data may be structured for representation in a tabular format (e.g., Microsoft® EXCEL, Power BI®, Azure®, comma separated values (CSV), etc.). The data elements of structured dataset 120 may include independent variables (e.g., input) and dependent variables (e.g., output), which may be referred to as parameters. Moreover, structured dataset 120 may belong to a knowledge domain that has an associated language (e.g., mean time to resolve (MTTR), antivirus detections, videogame output, etc.) or may be associated with one or more scenarios (e.g., time parameters to trends, temperature values to peaks, category parameters (or groups) to comparisons, combination of parameters to multiple outputs, one input to one output, one input to two outputs, etc.).

Table 1 shows an example of structured dataset 120 that includes two sets of output variables with parameter names Product A and Product B. The output variables may be defined as having data type "count" because they represent a count of the number of sales of Product A and Product B. The structured dataset of Table 1 also includes a set of input variables with a parameter name City. The input variables may be defined as having a data type "category" because the inputs represent individual samples in a category of cities.

TABLE 1

| Structured Dataset | | |
|---|---|---|
| City | Product A | Product B |
| Austin | 112 | 398 |
| Boston | 123 | 221 |
| Bronx | 546 | 211 |
| Brooklyn | 334 | 321 |
| Chicago | 450 | 321 |
| Dallas | 789 | 378 |
| Houston | 349 | 465 |
| Los Angeles | 600 | 345 |
| New York | 548 | 654 |
| Seattle | 500 | 236 |

Descriptive insight generator 108 is configured to receive structured dataset 120 from structured dataset source 122, or from graph to dataset converter 106, and output a descriptive insight to report generator 110. Descriptive insight generator 108 is configured to identify relationships among data elements of the structured dataset 120 and evaluate the relationships based on domain knowledge. For example, descriptive insight generator 108 may identify patterns in the data elements, such as, without limitation, trends, anomalies, peaks, compared values, etc. The domain knowledge may indicate which patterns are important or indicate a favorable outcome vs an unfavorable outcome. For example, a trend in a particular direction may indicate a preferred outcome. Descriptive insight generator 108 is configured to generate insights for structured dataset 120 based on the evaluation of the identified relationships. In some embodiments, structured dataset 120 may include data collected over multiple collection periods. For example, structured dataset 120 may include date for multiple hours, days, weeks, etc.

Report generator 110 is configured to generate an automated descriptive insight report for structured dataset 120. For example, the generated descriptive insight report may express the insights using human like sentences that describe the evaluated relationships of the data elements of structured dataset 120 and format the report for presentation in a user interface screen. In some embodiments, the automated descriptive insight reports may be displayed in user interface 118. For example, the automated descriptive insight reports may be displayed in a business intelligence dashboard. In some embodiments, system 100 may be incorporated into business intelligence software such as Microsoft® Power BI® so that descriptive insights may be automatically updated when data, charts, and/or graphs are updated in a business intelligence dashboard.

Text converter 114 is configured to convert the text of the automated descriptive insights to another form. For example, text converter 114 may be a text to speech converter that converts the text describing the insights to audible speech which is then played via speaker 116. Alternatively, or in addition, the text may be converted to braille. In this manner, visually impaired users may consume the automated descriptive insights. Moreover, text converter 114 may convert the text of the automated descriptive insights to another language (e.g., from English to German).

In some embodiments, rather than receiving structured dataset 120 directly, the computing device 102 receives digital visual graph 124 that represents data relationships in an image. For example, without limitation, digital visual graph 124 may include an image of a bar graph, a line graph, a pie chart, etc. As such, digital visual graph 124 may include dependent and independent variables (e.g., the independent variables may be referred to as input, and the dependent variables may be referred to as output). In one example, the image of digital visual graph 124 may have an x-axis with variable names shown in text at particular pixel locations along the x-axis, and a y-axis with variable names shown in text at particular pixel locations along the y-axis. Bars in a bar chart may be located at particular pixel locations along the x-axis, which correspond to the text along the x-axis. The bars may have a particular pixel height corresponding to the pixel locations of the text along the y-axis. Similarly, a line graph may have a line with a particular pixel height that corresponds to the pixel height of the text along the y-axis at particular pixel locations corresponding to the text along the x-axis. A pie chart may have variable names shown in text that positionally correspond to a radial area of pixels of the pie chart, which represents the magnitude of the output. In some embodiments, multiple bars in a bar chart may be associated with one textual variable along the x-axis (e.g., this may be referred to as a slicer), or multiple points on multiple lines in a line graph may correspond to one textual variable located along the x-axis. In other words, the graphs may have one input and one output or one input and multiple outputs. However, the digital visual graphs are not limited based on these examples, and may have any number of inputs, any number of outputs, and any orientation of the data represented in digital visual graph 124. Text in digital visual graphs 124 may represent, for example, numerical values (e.g., real numbers, integers, time, dates, dollars, a count, etc.) or categories (e.g., product names, company names, counties, states, etc.). For example, a bar graph may indicate counts for each element of a category (e.g. the number of products sold for each country). In another example, a slicer bar graph may indicate two outputs (counts) per input (category) (e.g., two bars representing the number of product A sold and the number of product B, per country). A slicer bar graph is shown in FIGS. 2B and 2C.

Graph to dataset converter 106 is configured to receive digital visual graph 124 from digital visual graph source 126 and convert the graph to structured dataset 120. Graph to dataset converter 106 is configured to provide structured dataset 120 to descriptive dataset generator 108 or otherwise make structured dataset 120 available for processing by descriptive dataset generator 108 as described above.

Graph to dataset converter 106 is configured to identify a type (e.g., classification) of digital visual graph 124 (e.g., line, bar, stacked bar) and determine the graph's orientation (vertical or horizontal). Graph to dataset converter 106 is configured to extract text from the graph image, such as x-axis text, y-axis text, or header or footer text. The text found in the image of digital visual graph 124 may indicate which domain knowledge is associated with the graph. Various logic is triggered based on the graph type (e.g., bar vs. line) to analyze the graph image and convert the image to structured dataset 120. Graph to dataset converter 106 is described in more detail with respect to FIG. 2A.

User interface 118 may include one or more input and/or output devices for computing device 102. For example, user interface 118 may be configured to receive input from a user via one or more user input devices (e.g., microphone, mouse, keyboard, touch screen, touchpad, or the like) and/or provide output to a display and/or audio device for the user. User interface 118 may be utilized to configure various parameters in system 100 as described below, and enable the user to interact with system 100 to generate automated descriptive insights. User interface 118 is configured to display automated descriptive insight reports that are generated by descriptive insight report generator 110. User interface 118 is described further with respect to FIGS. 3 and 9.

Figure 2A:
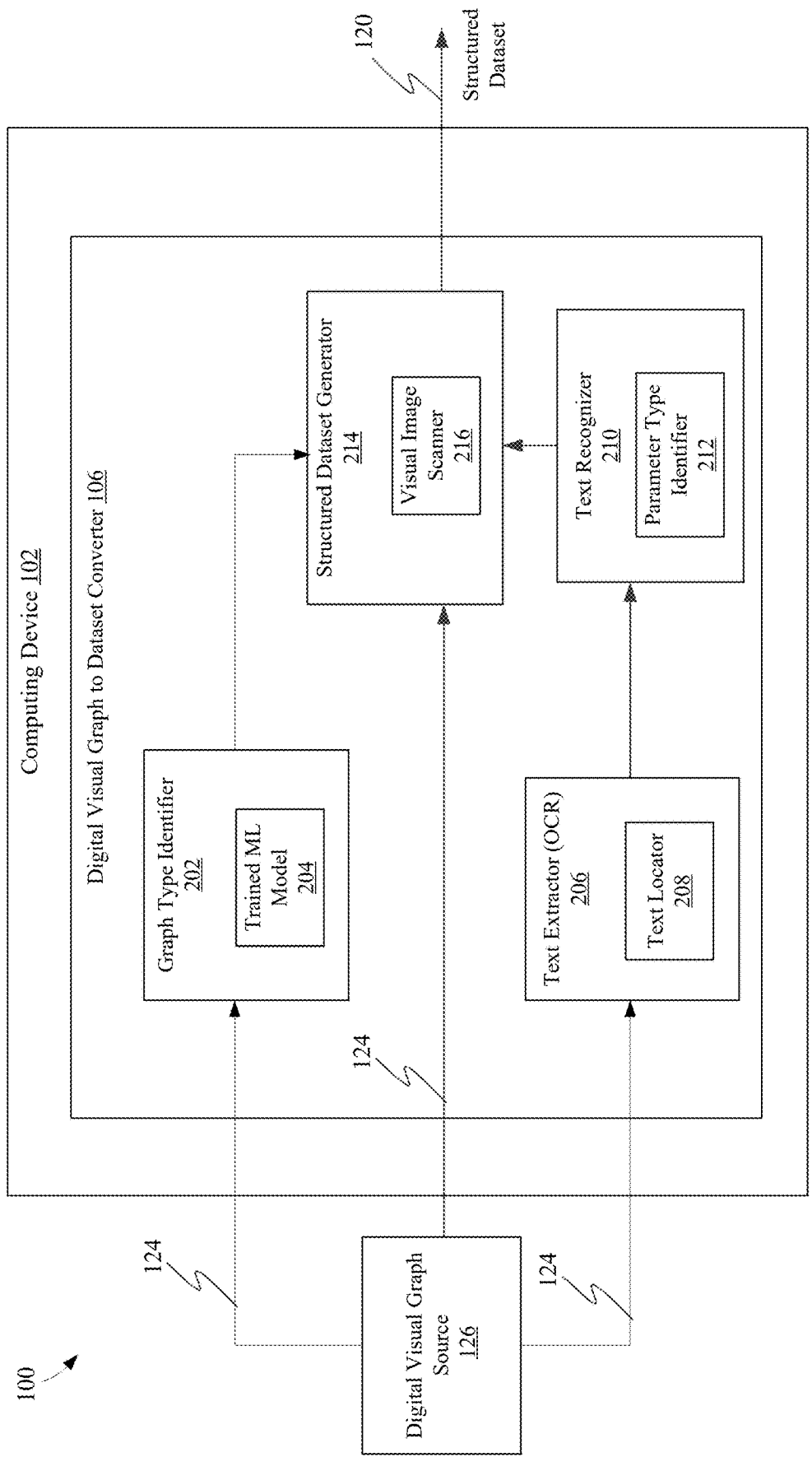
FIG. 2A is a block diagram of a system for converting a digital visual graph to a structured dataset, according to an example embodiment.
Figure 2C:
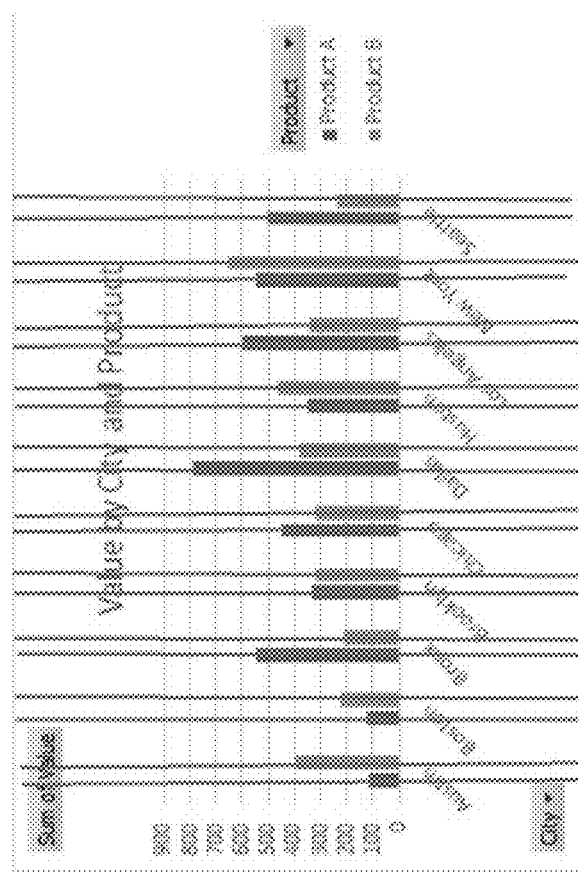
FIGS. 2B and 2C are diagrams illustrating horizontal and vertical scanning by the system of FIG. 2A.
Figure 2B:
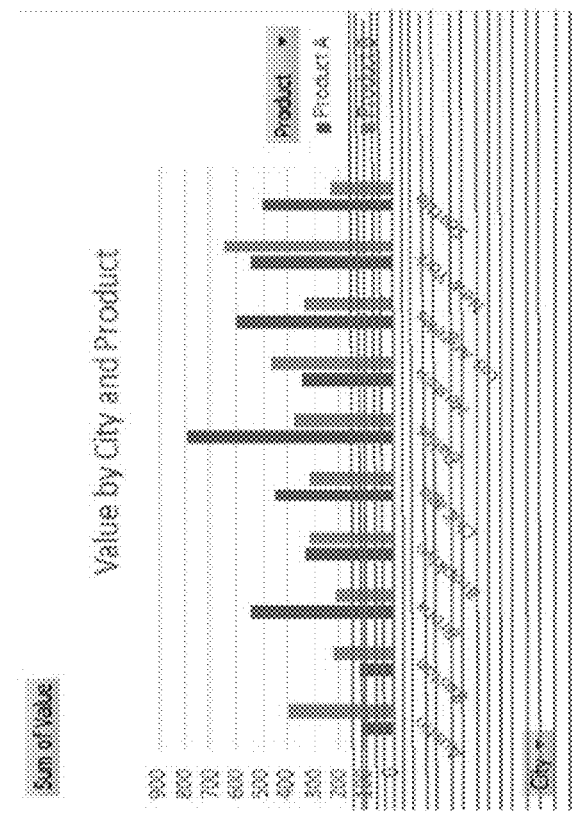

FIG. 2A is a block diagram of a system for converting a digital visual graph to a structured dataset, according to an example embodiment. FIG. 2A includes a computing device 102, graph to dataset converter 106, digital visual graph source 126, structured dataset 120, a graph type identifier 202, a trained machine learning model 204, a text extractor 206, a text locator 208, a text recognizer 210, a parameter type identifier 212, a structured dataset generator 214 and a visual image scanner 216.

Graph type identifier 202 is configured to receive digital visual graph 124, determine what type of graph it is (e.g., bar graph (vertical or horizontal), stacked bar graph, line graph, pie chart, etc.), and provide the graph type to structured dataset generator 214. Graph type identifier 202 includes a trained machine learning model 204 that is configured to identify the type of digital visual graph 124. For example, trained machine learning model 204 may be a classifier that is trained with existing and known graph labels (e.g., bar chart, line graph, etc.). The training process is described further below with respect to FIGS. 7 and 8. Trained machine learning model 204 is configured to identify a type for any digital visual graph that is input to graph type identifier 202.

Text extractor 206 is configured to receive digital visual graph 124 and extract text elements (e.g., words, numbers, symbols, etc.) from the image of digital visual graph 124. For example, text extractor 206 may utilize optical character recognition (OCR) to convert an image of text in the graph to a coded version of the text that can be read by a machine. Text extractor 206 includes a text locator 208 that is configured to identify the location of pixels that represent a text element, in the image of the digital visual graph, relative to a coordinate system for the digital visual graph (e.g., the pixel locations in the graph may be specified by coordinates of the coordinate system). Text extractor 206 is configured to provide the extracted text elements and the locations of the extracted text elements (e.g., relative to the coordinate system for digital visual graph 124) to structured dataset generator 214.

Text recognizer 210 is configured to recognize the extracted text elements. For example, text recognizer 210 may determine a domain for digital visual graph 124 by comparing the extracted text elements to text of one or more areas of domain knowledge. Parameter type identifier 212 is configured to determine parameter types (e.g., metadata) for each of the extracted text elements. For example, parameter type identifier 212 may use logic and/or domain knowledge to determine whether an extracted text element represents a date, a time, a count, an integer, a real value, a category (e.g., cities, products, etc.), a temperature, an x-axis variable (e.g., input or output), a y-axis variable (e.g., input or output), etc.

Structured dataset generator 214 is configured to receive outputs from graph type identifier 202 (e.g., the graph type), text extractor 206 (e.g., extracted text elements and the locations (pixel coordinates) of the extracted text elements), and text recognizer 212 (e. g., parameter types for the extracted text elements), and scan the measurements in the image of the digital visual graph 124 (e.g., scan the bars, lines, pie sections, etc.) to generate structured data set 120.

Visual image scanner 216 is configured to scan the image of digital visual graph 124 based on what type of graph it is (e.g., bar, line, pie chart) to detect the pixel coordinates of the input parameters (e.g., along the x-axis) and pixel positions of the magnitude of the output parameters (e.g., along the y-axis) relative to the coordinate system of digital visual graph 124. The pixel coordinates of the input parameters may be positive or negative, and the pixel coordinates of the magnitude of the output parameters may be positive or negative, with respect to the coordinates system of digital visual graph 124.

Structured dataset generator 214 is configured to utilize logic to generate structured dataset 120 by associating the text elements, the location of each of the text elements relative to the coordinate system, the parameter type of each of the text elements, and the magnitude and location of the output data relative to the coordinate system.

A particular method or logic for scanning digital visual graph 124 to generate structured dataset 120 may be determined based on which type of graph is detected by graph type identifier 202 for digital visual graph 124. For example, the following method may be implemented by graph to dataset converter 106 when graph type identifier 202 determines that digital visual graph 124 is a bar chart with two outputs per one input (e.g., a slicer bar chart) where the bars are oriented in the vertical direction and all of the bars extend above the x-axis (e.g., in the positive direction relative to the y-axis). Structured dataset generator 214 is configured to receive the number of vertical pixels (Pv) and the number of horizontal pixels (Ph) in digital visual graph 124 from text extractor 206 or graph type identifier 202. It is noted that all of the vertical bars in the graph will exist close to the x-axis but moving vertically away from x-axis, each of the bars will end at some point relative to the y-axis. Therefore, the graph image is first scanned horizontally beginning from or near the x-axis. For example, to scan horizontally the lowest third part of the image (e.g., 0 to Pv/3 pixels), digital visual graph 124 may be scanned horizontally for 20 lines, where each line is separated by Pv/3/20 pixels. Visual image scanner 216 may also be configured to detect the colors of the bars in digital visual graph 124 for each horizontal scan. See FIG. 2B that shows horizontal scan lines in a vertically oriented slicer bar chart (e.g., a slicer bar chart with a product A slice and a product B slice). As shown in FIG. 2B, the horizontal scan lines represent the pixel positions where data is gathered during the horizontal scan. The visual image scanner is configured to use color logic to approximate the colors of the bar chart. The colors scanned between bar boundaries may have different values to represent different parameters. Using pixel colors and positions, structured dataset generator 214 determines the number of bars on the graph, the different colors of the bars in the graph (as well as a background color), and midpoints of each of the bars in digital visual graph 124. Visual image scanner 216 of structured dataset generator 214 is configured to vertically scan digital visual graph 124 along the midpoint position of each of the bars in the bar graph to detect the number of pixels of each bar through the extent of the magnitude of each bar. See FIG. 2C for an example of vertically scanning each bar from the midpoint of each bar along the x-axis. The vertical scan lines shown in FIG. 2C represent the pixel positions where data is gathered during the vertical scan. For example, during the vertical scanning, structured dataset generator 214 is configured to determine a number of pixels (Pv) for each bar, which represents values of the bars in digital visual graph 124. Using the output of text extractor 206 that is associated with the y-axis, structured dataset generator 214 determines a scale of the graph in terms of pixels, and determines the actual values at the top of the bars. The output of text extractor 206 with respect to parameter names is used to construct structured dataset 120. Table 1 (above) is an example of a structured dataset 120 that may be generated based on the digital visual graph shown in FIGS. 2B and 2C.

Figure 3:
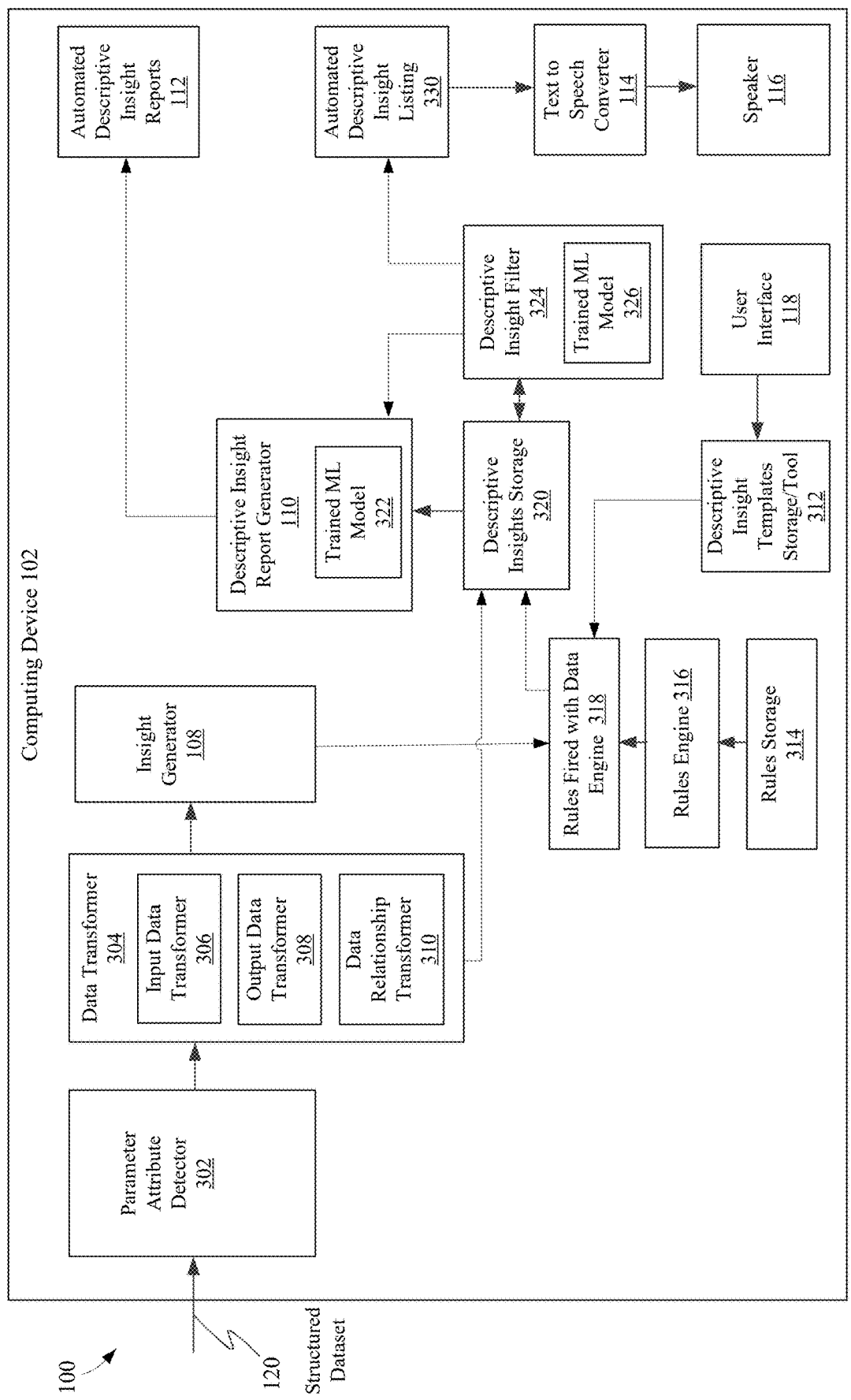
FIG. 3 is a block diagram of a system for generating automated descriptive insight reports from a structured dataset, according to an example embodiment.

FIG. 3 is a block diagram of a system for generating automated descriptive insight reports from a structured dataset, according to an example embodiment. Referring to FIG. 3, system 100 is shown. System 100 includes computing device 102, insight generator 108, descriptive insight report generator 110, automated descriptive insight reports 112, user interface 118, text converter 114, and speaker 116. Also shown in system 100 are a parameter attribute detector 302, a data transformer 304, an input data transformer 306, an output data transformer 308, a data relationship transformer 310, a rules storage 314, a rules engine 316, and a rules fired with data engine 318. The system 100 also includes descriptive insight templates storage 312, a descriptive insights storage 320, a descriptive insight filter 324, a trained machine learning model 322, a trained machine learning model 326, and an automated descriptive insight listing 330.

Parameter attribute detector 302 is configured to receive structured dataset 120 and determine metadata of the data elements for each parameter in the structured dataset 120. As described above, structured dataset 120 may be received from structured dataset source 122 or may be generated by digital visual graph to dataset converter 106. Parameter attribute detector 302 is configured to utilize logic and/or domain knowledge to determine parameter attributes such as data types (e.g., date, time, count, integer, real, category, group, temperature, etc.). Moreover, parameter attribute detector 302 is configured to determine whether the data elements in structured dataset 120 are input parameters (e.g., independent variables) or output parameters (e.g., dependent variables), which may be determined based on the data type of the data elements. Parameter attribute detector 302 is configured to utilize logic and/or domain knowledge to determine the importance of data elements and how outcomes are evaluated (e.g., which outcomes are good or positive vs. poor or negative outcomes). In some embodiments, the parameter attribute detector 302 is configured to receive the metadata for structured dataset 120 from digital visual graph to dataset converter 106.

Each of the data elements in structured dataset 120 may be associated with a parameter name. For example, referring to Table 1 above, the data elements were generated from the bar graph shown in FIGS. 2B and 2C, where the bars represent the values of Product A and Product B in each of the cities named along the x-axis. The example structured dataset 120 of Table 1 includes the parameter names City, Product A, and Product B, where the data elements of the column under parameter name City are input parameters (e.g., independent variables) and the data elements under parameter names Product A and Product B are output parameters (e.g., dependent variables). Therefore the example structured dataset 120 shown in Table 1 has two output parameters for each input parameter. The input data elements, of parameter name City, may be associated with a data type of "category" or "group." The output is sliced into Product A and Product B. Product A values can be compared with Product B values. The output data elements, of parameter names Product A and Product B, may be associated with a data type of real because they represent the value of the products in each city.

As described above, system 100 is configured to utilize its own language to differentiate between different types of variables and the importance of such variables for generating descriptive intents. A knowledge base is built to identify how to interpret or rate changes in data of a structured dataset. For example, with respect to sales of products, a higher number of sales is good result, whereas with respect to a number of non-detected malware applications, a negative trend would be a better result.

Data transformer 304 is configured encode the parameter names for the data elements of structured dataset 120, where each of the encoded parameter names indicates the detected attributes (metadata) for the respective data elements associated with the parameter name. An encoded parameter name may indicate what type of data it represents and how the data elements associated with that parameter name may be evaluated or used to generate an insight for the data elements. For example, data elements associated with category type parameter names may be compared with each other while data elements associated with date type parameters may be trended over time, etc. One example format for an encoded parameter name includes (1) a parameter type (e.g., input, output, slicer, etc.), (2) data types or acronyms for one or more data types (e.g., integer (INT), real (R), date (DATE), count (CNT), category (CAT), etc.), and (3) an index number that increments for each encoded parameter name of a particular type. For example, input data transformer 306 may be configured to map parameter name City to an encoded parameter name Input_Category_1 (or Input_CAT_1). Output data transformer 308 may be configured to map the parameter ProductA to encoded parameter name Output_Real_1 (or Output_R_1). In this embodiment, the output has two values. In other words, the value of the product for each city is sliced into ProductA and ProductB. Therefore, the encoded output parameter name could be Slicer_Category_1 (or Slicer_CAT_1). For example, the output value of Product A for the city of Boston may be 100 and the value of Product B for Boston may be 200. Then the total value for Boston is 300, which is sliced among the two products. The encoded parameter names may indicate that the output values for Product A and Product B associated with input City can be compared or averaged. However, the encoded parameter names may be more detailed to include more information that indicates what kind of data is included in the data elements and how the data elements can be related or evaluated for the purpose of generating insights (e.g., compared, trended, averaged, combined, etc.). For example, data transformer 304 may be configured to identify data elements for a slicer as a group of items and assign an encoded data type as Category (or CAT), which may represent, for example, items such as countries or products. The encoded data type may indicate that the data elements may be compared (e.g., rather than trended over time) in an automated descriptive insight. Also, domain knowledge may indicate that the top two highest outputs associated with the item group are important for the purpose of generating the automated descriptive insight.

In another embodiment, data relationship transformer 310 is configured to generate encoded parameter names that indicate a relationship between data elements. For example, encoded parameter names may indicate that two outputs are related by including a parameter type of Relationship (or REL) in an encoded parameter name. Table 2 (below) includes an example structured dataset 120 having parameter names Product (an input variable), Sold Items (an output variable) and Price (an output variable). The data elements associated with parameter name Product identify a product and may be assigned a data type Category (or CAT). The data elements associated with parameter name Sold Items may indicate a count of the number of items that were sold for each associated product and may be assigned data type INT. The data elements associated with parameter name Price may indicate the price of each sold product and may be assigned data type Real (R).

Data transformer 304 is configured to generate the mapping shown in Table 3 (below). Table 3 shows a mapping between the original parameter names and encoded parameter names and includes a new output parameter name having a Relationship type element that may be used to determine an insight for the dataset. For example, based on the encoded parameter names, the system may determine that the two outputs (Sold Items and Price) may be multiplied to determine a total price that may be expressed in an automated descriptive insight. The term Item_Count in Table 3 indicates that the output Output_INT_1 is a count of items that may be multiplied by the real value of the price.

Table 4 below shows the example structured dataset of Table 1 converted such that the original parameter names are replaced with encoded parameter names.

TABLE 2

Example Structured Dataset

| Product | Sold items | Price |
|---------|------------|-------|
| A | 5 | 20 |
| B | 500 | 2.5 |
| C | 200 | 3 |
| D | 150 | 7 |
| E | 100 | 3.5 |
| F | 55 | 9 |

TABLE 3

| Parameter Name Mapping | | |
|---|---|---|
| Original Parameter | New Parameter | Input type |
| Product | Input_Category_1 | Input |
| Sold items | Output_INT_1 | Output |
| Price | Output_R_1 | Output |
| Total Price of Sold Items | REL_(Output_R_1, Output_INT_1, Item_Count) | Relationship |

TABLE 4

| Converted Structured Dataset | | |
|---|---|---|
| Input_ItemGroup_1 | Output_INT_1 | Output_R_1 |
| A | 5 | 20 |
| B | 500 | 2.5 |
| C | 200 | 3 |
| D | 150 | 7 |
| E | 100 | 3.5 |
| F | 55 | 9 |

Table 5 (below) includes an example of data types and related knowledge that may be utilized to generate automated descriptive insights.

TABLE 5

| Example Data Types and Corresponding Knowledge | | | |
|---|---|---|---|
| Encoded Data Type (Data Type) | Parameter Type | Description | Knowledge for Automatically Determining Descriptive Intents |
| DailyDate (Daily Date Time) | Input | Two consecutive time samples occur within one day. | The time difference is too fine grained for defining trends over two consecutive days. Data must be further processed to capture details of the trends. |
| DateGroup (Weekly and Monthly Time) | Input | Two consecutive time samples span either a week or a month | The resolution of two DateGroup samples is sufficient to determine a trend. |
| DateRelatedGroup (Group of Related Dates) | Input | A group of items such as product versions, or release versions | Version numbers increase with dates or time. |
| Category (Group of Items) | Input/ Slicer | Any group of items or categories such as countries, products, events, etc. | Items can be compared between the groups (rather than applying trending to the data). For example, find the top 2 highest and the top 2 lowest groups when the group includes more than 4 items, otherwise the description can include all the groups. |
| INT (Integer Values) | Output | Any integer value | |
| RV (Real Values) | Output | Two related outputs including one output having counts and the other output being an average | |
| Average_Count (Average to Count) | Relationship | Two related outputs including one output having counts and the other output being an average. | |
| Total_Count (Total to Count) | Relationship | Two related outputs including one output having counts and the other output could being a sum total | |
| Item_Count (Item to Count) | Relationship | Two related outputs including one output being an item value and the other output being the number of items | |

Insight generator 108 is configured to identify relationships among the data elements of structured dataset 120 based on the encoded parameter name and content of each respective data element of the structured dataset. Insight generator 108 is configured to utilize logic to evaluate the identified relationships based on domain knowledge and generate insights for data elements of the structured dataset based on the evaluation. For example, multiple steps of statistical analysis may be performed on the data elements of the data structure to gather insights. The statistical analysis may be based on scenarios that involve the encoded parameter types. For example, trends are determined for time parameters, comparisons are used for group parameters, multiple incites are generated for a combination of parameters. Scenarios may also be based on the parameter types, such as one input and one output, two inputs and one output, etc. Table 6 shows example scenarios for generating insights.

TABLE 6

Example Data Types and Corresponding Knowledge

| Scenario | Sub Scenario | Description |
|---|---|---|
| One input one output | Input is DailyDate<br>Output can be either INT, Real<br>Input is DateRelatedGroup or DateGroup<br>Output can be either INT, RV<br>Input GroupItem<br>Output can be either INT, RV | |
| Two inputs one output | Inputs are DailyDate and ItemGroup<br>Output can be either INT, Real | |
| Two inputs one output | Inputs is DateRelatedGroup or DateGroup and ItemGroup,<br>Output can be either INT, Real | |
| One Input multiple unrelated outputs | Input is DailyDate<br>Outputs can be INT and/or Real<br>Input is DateRelatedGroup or DateGroup<br>Output can be can be INT and/or RV<br>Input ItemGroup<br>Output can be INT and/or Real | |
| Two inputs multiple unrelated outputs | Inputs are DailyDate and ItemGroup<br>Output can be INT and/or Real | |
| Two inputs multiple unrelated outputs | Inputs are DateRelatedGroup or DateGroup and ItemGroup,<br>Output can be INT and/or Real | |
| One Input multiple related outputs | Input is DailyDate,<br>Outputs can be INT and/or Real + New Output(s)<br>Input is DateRelatedGroup or DateGroup, Output can be INT and/or Real + New Output(s)<br>Input is ItemGroup, Output can be INT and/or Real + New Output(s) | The insight generator performs calculations according to the relationships of the outputs and creates a new output parameter. |
| Two inputs multiple related outputs | Inputs are DailyDate and ItemGroup,<br>Output can be INT and/or Real + New Output(s) | The insight generator performs calculations according to the relationships of the outputs and creates a new output |
| Two inputs multiple related outputs | Inputs are DateRelatedGroup or DateGroup and ItemGroup,<br>Output can be INT and/or Real + New Output(s) | The insight generator performs calculations according to the relationships of the outputs and creates a new output |

Descriptive insight templates storage 312 is configured to store and/or generate one or more descriptive insight templates. The descriptive insight templates are designed to receive the generated insights from insight generator 108 and automatically generate descriptive insights. User interface 118 may be configured to receive user input to create and/or store the one or more descriptive insight templates in descriptive insight template storage 312. In some embodiments, descriptive insight template storage 312 is configured with a user interface for creating the templates by a user. For example, a developer may operate a user interface provided by the descriptive insights templates storage 312 to design and store the descriptive insight templates. The descriptive insight templates may be configured to produce human like language around the generated insights so as to express relationships among data elements in structured dataset 120 or new data generated by data transformer 304 and/or insight generator 108. Different descriptive insight templates may be applicable in different scenarios or for different types of parameters.

Rules storage 314 is configured to store one or more rules for selecting descriptive insight templates based on data included in an insight generated by insight generator 108. Rules engine 316 is configured to receive insights generated by insight generator 108, and compare data in the insights with rules received from rules storage 314. Rules engine 316 is configured to trigger or select a particular rule depending on the data included in an insight. Each rule is associated with a descriptive insight template that is stored in descriptive insight templates storage 312. In one embodiment, insight generator 108 is configured to generate an insight indicating:

$$\text{at time } T1 \text{ the value } V1, \text{ and at time } T2 \text{ the value } V2 \quad (1)$$

$$\text{a percent of change in } V1, V2, c\%, \text{ with text of Txt} \quad (2)$$

where V1=40, T1=RS5, V2=30, T2=RS4, Txt="considerable increase," and %=33%. These insight variables may be associated with a parameter1=MTTR.

Rules storage 314 may include a rule r1, which is triggered by rules engine 316 when T1, T2, V1, V2, c % and Txt are detected in an insight received from insight generator 108. Rule r1 may be associated with a particular descriptive insight template t1 in rules engine 316. For example, rules engine 316 is configured to select the descriptive insight template t1 when it detects the parameters T1, T2, V1, V2, c % and Txt in an insight. Descriptive insight template t1 may be configured as:

$$\text{The \#\#parameter 1 was \#V1 for \#T1 compared to} \\ \text{\#V2 for \#T2, a \#Txt of \#c\%.} \quad (3)$$

Rules fired with data engine 318 is configured to receive the descriptive insight template (e.g., t1) and the insight data generated by insight generator 108 (e.g., T1, T2, V1, V2, c %, Txt, and parameter1) and automatically generate a descriptive insight by inserting the insight data into the template according to the identified parameter names in the insight. For example, the descriptive insight for parameter1 may be generated as follows:

$$\text{The MTTR was 40 for RS5 compared to 30 for} \\ \text{RS4, a considerable increase of 33\%.} \quad (4)$$

Rules fired with data engine 318 is configured to store the descriptive insight in descriptive insights storage 320. In some embodiments, rules fired with data engine 318 is configured to generate and store a plurality of descriptive insights that are based on a plurality of insights generated by insight generator 108 using structured dataset 120. For example, insight generator 108 is configured to generate many insights when there are many changes in structured dataset 120 relative to a prior structured dataset.

Descriptive insight filter 324 is configured to receive a plurality of descriptive insights for structured dataset 120 from descriptive insights storage 320 and provide a selected number (or reduced set) of the plurality of descriptive insights to descriptive insight report generator 110 and/or automated descriptive insight listing 330. Trained machine learning model 326 is configured to cluster the plurality of descriptive insights and select or filter the insights based on the clustering results. For example, trained machine learning model 326 may select descriptive insights that are most important or most interesting to a user and/or may discard redundant descriptive insights. In some embodiments, trained machine learning model 326 may include a clustering algorithm that is trained using unsupervised learning to find patterns in the plurality of insights and/or group the insights. For example, the clustering algorithm may be based on nearest neighbor or k nearest neighbor techniques. However, the disclosure is not limited to any specific type of algorithm.

Descriptive insight report generator 110 is configured to receive a full set of the automatically generated descriptive insights from descriptive insight storage 320 or a reduced set of descriptive insights from the descriptive insight filter 324. Trained machine learning model 322 is configured to generate automated descriptive insight reports 112, which may be displayed in user interface 118. For example, the automated descriptive insight reports may be displayed in a business intelligence dashboard. A descriptive insight report may include various sections or parts, for example, a header, an introduction, and sections for displaying the descriptive insights. Some sections may display digital visual graphs or structured datasets that correspond to the descriptive insights. Trained machine learning model 322 is configured to determine which report style to use and to display the descriptive insights in designated sections of the report. Trained machine learning model 322 may include, for example, a deep neural network algorithm that may be trained using various types and styles of descriptive insight reports. Trained machine learning model 322 receives a reduced set of descriptive insights from descriptive insight filter 324. Trained machine learning model 322 is configured to generate a more concise user interface to display a more concise report that may include the important insights and/or reduced redundancy in the reported insights.

Automated descriptive insight listing 330 may include a reduced set of descriptive insights received from descriptive insight filter 324 or may include a full set of descriptive insights received from descriptive insights storage 320. Text converter 114 is configured to receive the reduced (or full) set of descriptive insights and convert digital content of the descriptive insights to a form suited for perception by a visually impaired user. For example, text converter 114 may be configured to convert automated descriptive insight listing 330 to a speech signal and transmit the speech signal to speaker 116 for audible playback of automated descriptive insight listing 330. In another example, text converter 114 is configured to generate braille based on automated descriptive insight listing 330. In some embodiments, text converter 114 is configured to translate the automated descriptive insight listing 330 to one or more different languages (e.g., from English to German, Mandarin, Spanish, etc.). Translated descriptive insight listings 330 may be made into a report by trained machine learning model 322 or converted to speech, or braille, for example.

Figure 4:
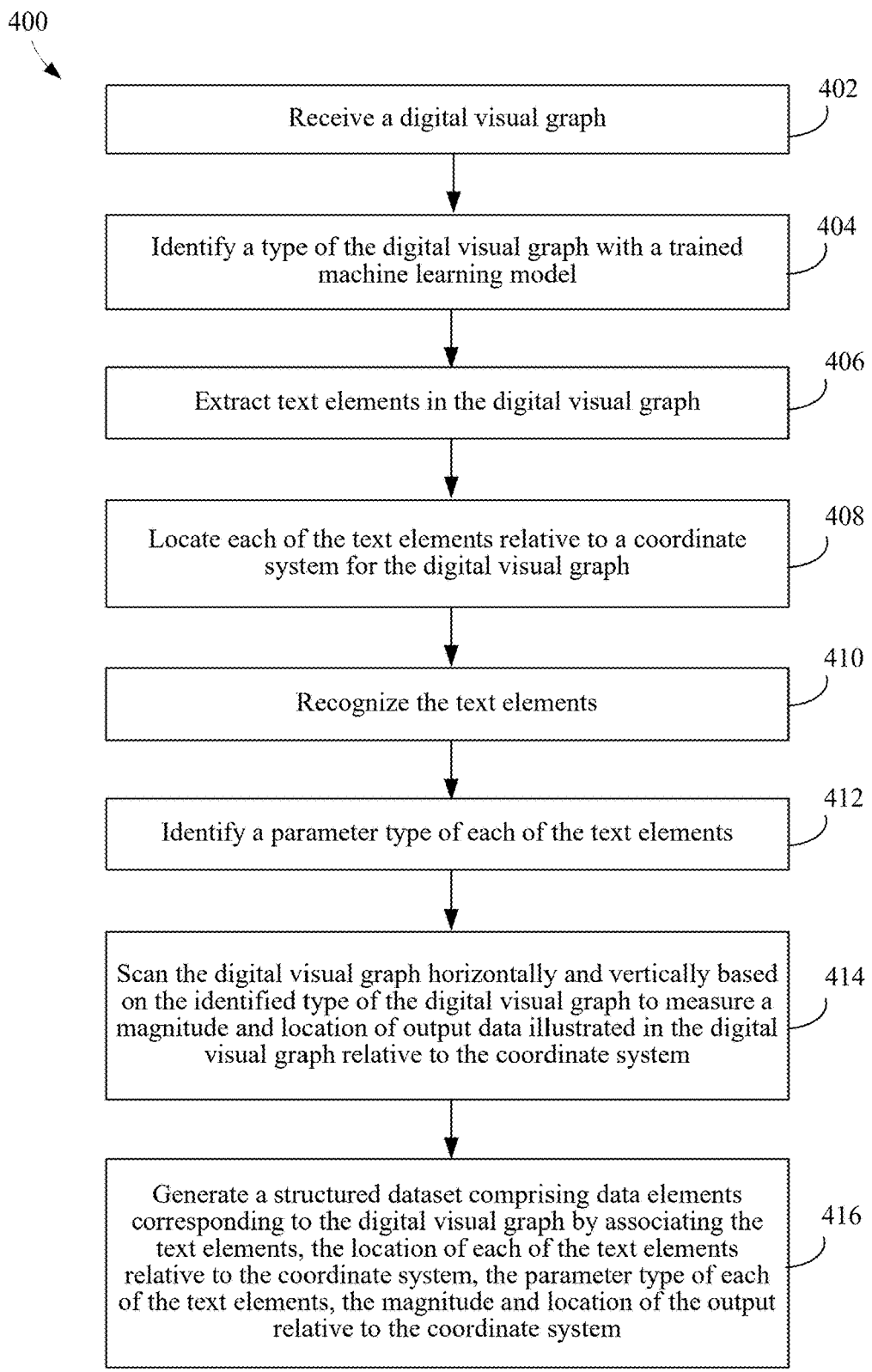
FIG. 4 is a flowchart for converting a digital visual graph to a structured dataset, according to an example embodiment.

Computing device 102 may operate in various ways to perform functions of system 100. For example, FIG. 4 is a flowchart 400 for converting a digital visual graph to a structured dataset, according to an example embodiment. In some embodiments, the steps of flowchart 400 may be performed by the computing device 102. Note that the steps of flowchart 400 may be performed in an order different than shown in FIG. 4 in some embodiments. Furthermore, not all steps of flowchart 400 need to be performed in all embodiments. The steps of flowchart 400 are described with reference to FIG. 2A.

Flow chart 400 begins with step 402, in step 402, computing device 102 receives digital visual graph 124.

In step 404, graph type identifier 202 utilizes trained machine learning model 204 to identify a type of the digital visual graph (e.g., a bar graph, a slicer bar graph, a stacked bar graph. a line graph, a pie chart, a graph with a particular number of inputs and a particular number of outputs, etc.)

In step 406, text extractor 206 extracts text elements in digital visual graph 124. For example, text extractor 206 may detect text (e.g., words, numbers, symbols, etc.) such as x-axis text, y-axis text, or header or footer text.

In step 408, text locator 208 may locate each of the text elements relative to a coordinate system for digital visual graph 124. For example, text locator 208 identifies the location of pixels that represent a text element, in the image of the digital visual graph, relative to a coordinate system for the digital visual graph (e.g., the pixel locations in the graph may be specified by coordinates of the coordinate system).

In step 410, text recognizer 210 may recognize the text elements of the digital visual graph 124. For example, text recognizer 210 may determine a domain for the digital visual graph 124 by comparing the extracted text elements to text of one or more areas of domain knowledge.

In step 412, parameter type identifier 212 identifies a parameter type of each of the text elements. For example, parameter type identifier 212 may use logic and/or domain knowledge to determine whether an extracted text element represents a date, a time, a count, an integer, a real value, a category (e.g., cities, products, etc.), a temperature, an x-axis variable (e.g., input or output), a y-axis variable (input or output), etc.

In step 414, visual image scanner 216 scans digital visual graph 124 horizontally and vertically based on the identified type of the digital visual graph 124 to measure a magnitude and location of output data illustrated in the digital visual graph 124 relative to the coordinate system. For example, visual image scanner 216 scans the image of digital visual graph 124 based on what type of graph it is (e.g., bar, line, pie chart) to detect the pixel coordinates of the input parameters (e.g., along the x-axis) and pixel positions of the magnitude of the output parameters (e.g., along the y-axis) relative to the coordinate system of digital visual graph 124. The pixel coordinates of the input parameters may be positive or negative, and the pixel coordinates of the magnitude of the output parameters may be positive or negative, with respect to the coordinates system of digital visual graph 124.

In step 416, structured dataset generator 214 generates the structured dataset comprising data elements corresponding to the digital visual graph 124 by associating the text elements, the location of each of the text elements relative to the coordinate system, the parameter type of each of the text elements, the magnitude and location of the output relative to the coordinate system. For example, structured dataset generator 214 receives outputs from graph type identifier 202 (e.g., the graph type), text extractor 206 (e.g., extracted text elements and the locations (pixel coordinates) of the extracted text elements), and text recognizer 212 (e.g., parameter types for the extracted text elements), and output from visual image scanner 216 of the image of digital visual graph 124 (e.g., the bars, lines, pie sections, etc.). Structured dataset generator 214 utilizes logic to generate structured dataset 120 by associating the text elements, the pixel locations of each of the text elements relative to the coordinate system, the parameter type of each of the text elements, and the pixel magnitude and pixel location of the output data relative to the coordinate system of digital image graph 124.

Figure 5:
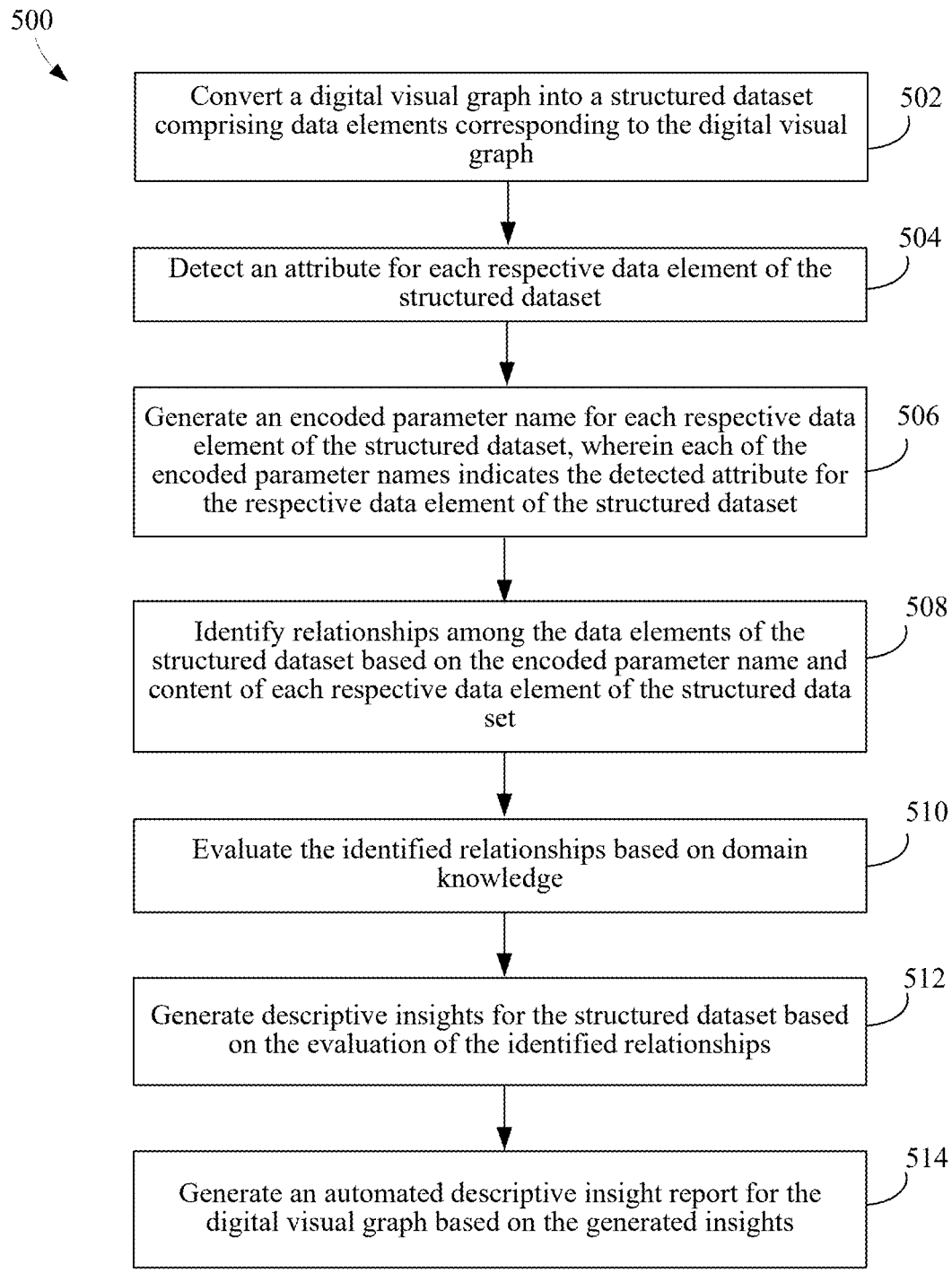
FIG. 5 is a flowchart for generating automated descriptive insight reports from a digital visual graph, according to an example embodiment.

Computing device 102 may operate in various ways to perform functions of system 100. For example, FIG. 5 is a flowchart for generating automated descriptive insight reports from a digital visual graph, according to an example embodiment. Note that the steps of flowchart 500 may be performed in an order different than shown in FIG. 5 in some embodiments. Furthermore, not all steps of flowchart 500 need to be performed in all embodiments. The steps of flowchart 500 are described with reference to FIGS. 2A and 3.

In step 502, digital visual graph to dataset converter 106 converts digital visual graph 124 into structured dataset 120 comprising data elements corresponding to digital visual graph 124.

In step 504, parameter attribute detector 302 detects an attribute for each respective data element of structured dataset 120.

In step 506, data transformer 304 generates an encoded parameter name for each respective data element of structured dataset 120, where each of the encoded parameter names indicates the detected attribute for the respective data element of structured dataset 120.

In step 508, insight generator 108 identifies relationships among the data elements of structured dataset 120 based on the encoded parameter name and content of each respective data element of the structured dataset 120.

In step 510, insight generator 108 evaluates the identified relationships based on domain knowledge.

In step 512, insight generator 108 generates descriptive insights for structured dataset 120 based on the evaluation of the identified relationships.

In step 514, descriptive insight report generator 110 generates automated descriptive insight report for digital visual graph 124 based on the generated descriptive insights.

Figure 6:
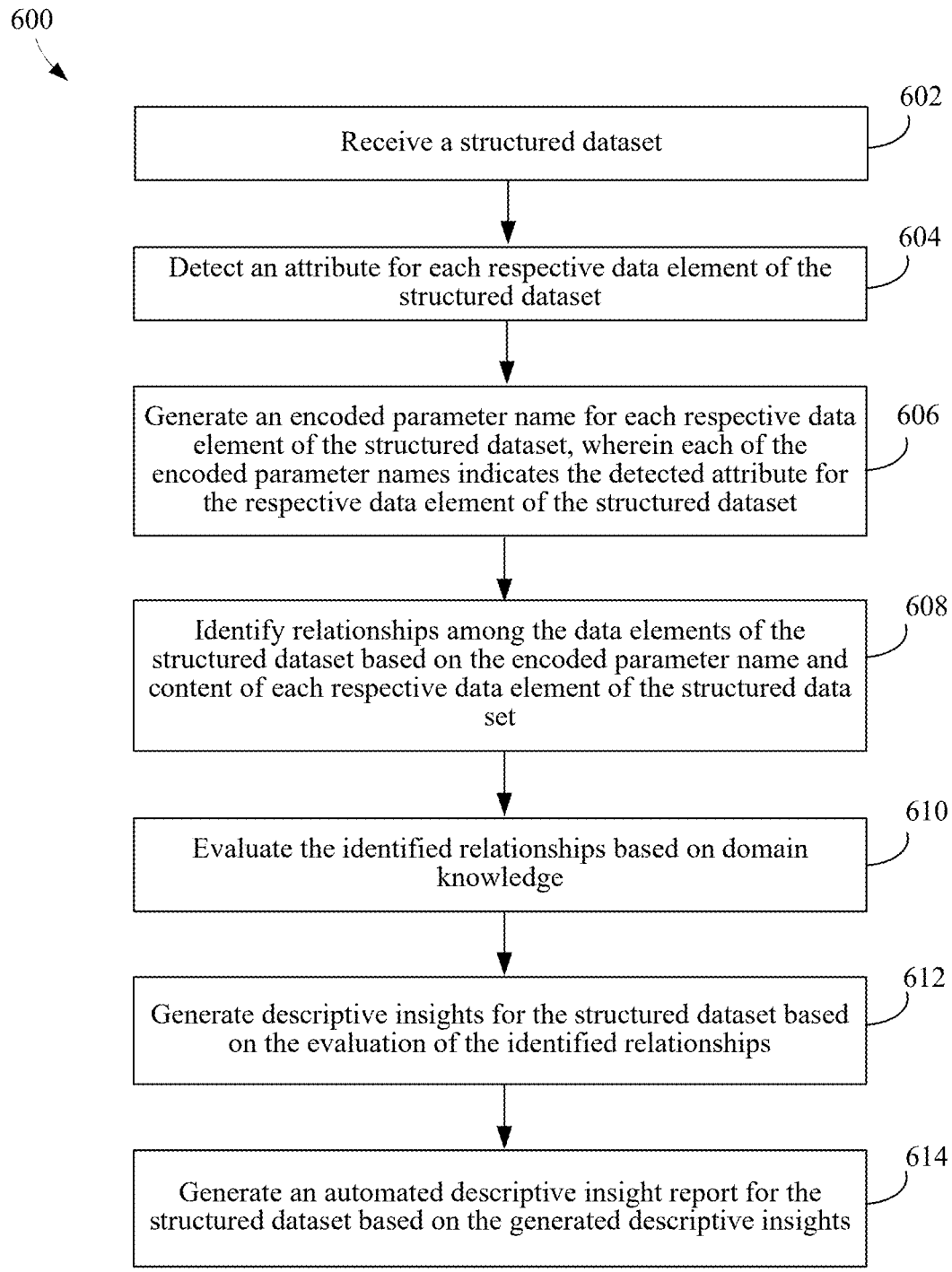
FIG. 6 is a flowchart for generating automated descriptive insight reports from a structured dataset, according to an example embodiment.

Computing device 102 may operate in various ways to perform functions of system 100. For example, FIG. 6 is a flowchart for generating automated descriptive insight reports from a structured dataset, according to an example embodiment. Note that the steps of flowchart 600 may be performed in an order different than shown in FIG. 6 in some embodiments. Furthermore, not all steps of flowchart 600 need to be performed in all embodiments. The steps of flowchart 600 are described with reference to FIG. 3.

In step 602, the computing device 102 receives structured dataset 120.

In step 604, parameter attribute detector 302 detects an attribute for each respective data element of structured dataset 120.

In step 606, data transformer 304 generates an encoded parameter name for each respective data element of the structured dataset 120, where each of the encoded parameter names indicates the detected attribute for the respective data element of structured dataset 120.

In step 608, insight generator 108 identifies relationships among the data elements of structured dataset 120 based on the encoded parameter name and content of each respective data element of structured dataset 120.

In step 610, insight generator 108 evaluates the identified relationships based on domain knowledge.

In step 612, insight generator 108 generates descriptive insights for the structured dataset based on the evaluation of the identified relationships.

In step 614, descriptive insight report generator 110 generates automated descriptive insight report 112 for structured dataset 120 based on the generated descriptive insights.

Figure 7:
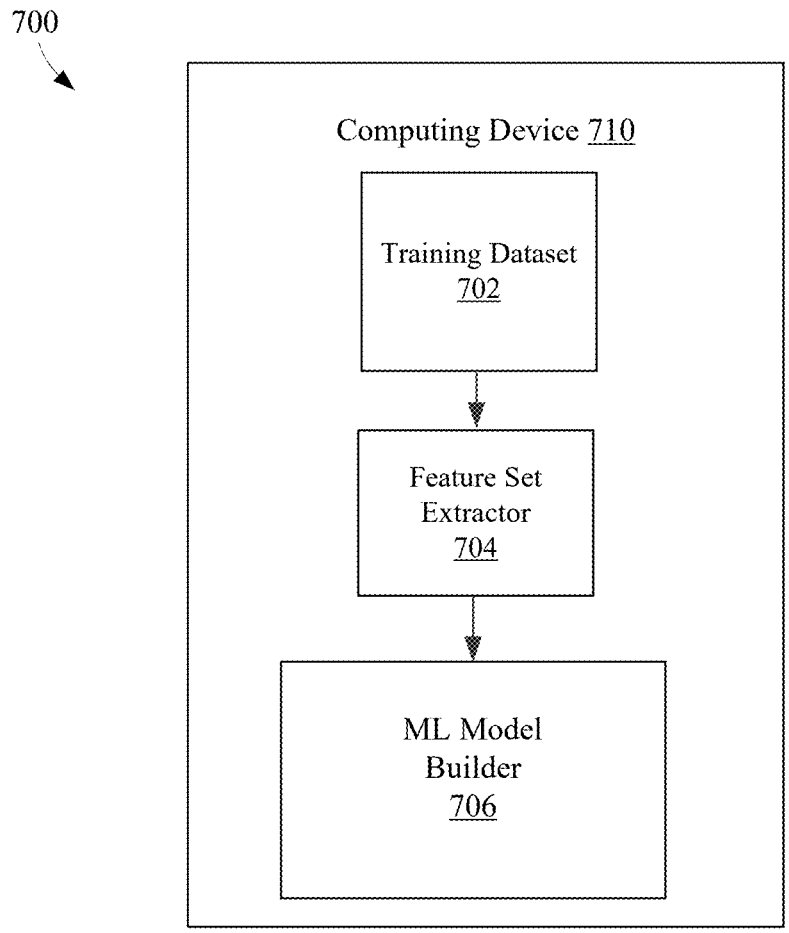
FIG. 7 is a block diagram of a system for training three different machine learning models for identifying a graph type, generating an automated descriptive insight report, and filtering insights for inclusion in a report, according to an example embodiment.

FIG. 7 is a block diagram of a generalized system for training a machine learning model. The system of FIG. 7 may be used to train a machine learning model that can be used in system 100. For example, the system of FIG. 7 may be used to train a machine learning model for identifying a graph type, to train a machine learning model for generating an automated descriptive insight report, or to train a machine learning model for filtering insights for inclusion in a report, according to example embodiments. Referring to FIG. 7, a system 700 is shown. System 700 includes a computing device 720, a training dataset 702, a feature set extractor 704, and a machine learning model builder 706.

Although the system 700 is shown hosted on the computing device 710, in some embodiments, the system 700 may be included on computing device 102 or on another computing device. Computing device 710 and another computing device suitable to host the system 700 is described with respect to FIG. 9.

The elements shown in system 700 for training a machine learning model may vary depending on which of the three machine learning models in the system 100 is being trained. For example, trained machine learning model 204 is utilized for graph type identification in graph type identifier 202. Trained machine learning model 322 is utilized for generating descriptive insight reports in descriptive insight report generator 110. Trained machine learning model 326 is utilized for filtering descriptive insights in descriptive insight filter 324 to generate a reduced set of descriptive insights.

As described above, machine learning model 204 may be used to identify graph types of digital visual graph images in graph type identifier 202. In this embodiment, training set 702 may include several of various types of graph images (e.g., bar charts, bar charts with multiple inputs, line graphs, line graphs with multiple lines, pie charts, etc.), and corresponding labels that indicate each of the various types of graph images. Feature set extractor 704 may scan the digital visual graph images and generate feature vectors for the graph images and the corresponding labels. In one embodiment, machine leaning model 204 utilizes neural networks for identifying the digital visual graphs. In this embodiment, machine learning model builder 706 may be configured to receive the feature vectors from feature set extractor 704 and train a neural network model based on the feature vectors to generate trained machine learning model 204. Trained machine learning model 204 may be tested for accuracy and/or precision. However, the disclosure is not limited to any specific type of machine learning model and any suitable machine learning model may be utilized in machine learning model 204.

As described above, trained machine learning model 322 is utilized for generating descriptive insight reports in the descriptive insight report generator 110. The descriptive insight reports may include various elements some of which may depend on the quantity and/or types of insights being displayed. For example, a descriptive insight report may include various sections such as a header, an introduction, and sections for displaying the descriptive insights. Some sections may display digital visual graphs or structured datasets that correspond to the descriptive insights. Trained machine learning model 322 is configured to determine which style of report to use for a set of descriptive insights and how to display the various sections and descriptive insights in the report. The trained machine learning model 322 may include, for example, a deep neural network algorithm.

In this embodiment, training dataset 702 may include images of several of various types and styles of descriptive insight reports and corresponding labels. The feature set extractor 704 may scan the descriptive insight report images in the training dataset 702 and generate feature vectors for the images and corresponding labels. In this embodiment, machine learning model builder 706 may be configured to receive the feature vectors from feature set extractor 704 and train a deep neural network model based on the feature vectors to generate trained machine learning model 322. Trained machine learning model 322 may be tested for accuracy and/or precision. However, the disclosure is not limited to any specific type of machine learning model and any suitable machine learning model may be utilized in machine learning model 322.

As described above, trained machine learning model 326 is utilized for filtering descriptive insights in descriptive insight filter 324 to generate a reduced set of descriptive insights. Trained machine learning model 326 may be configured to cluster a plurality of descriptive insights, select or filter insights that are more important or more interesting, and/or discard redundant descriptive insights. In some embodiments, trained machine learning model 326 may include a clustering algorithm to find patterns in the plurality of insights and/or to group the descriptive insights (e.g., for detecting redundant insights). In some embodiments, the clustering algorithm may be based on nearest neighbor or k nearest neighbor techniques.

In this embodiment, machine learning model 326 may be trained using unsupervised leaning to find the patterns and grouping the descriptive insights using exploratory data analysis. Training dataset 702 may include several sets of filtered descriptive insights without corresponding labels. The feature set extractor 704 is configured to generate feature vectors for the several sets of filtered descriptive insights. In this embodiment, machine learning model builder 706 may be configured to receive the feature vectors from feature set extractor 704 and train the clustering model based on the feature vectors to generate trained machine learning model 326. Trained machine learning model 326 may be tested for accuracy and/or precision. However, the disclosure is not limited to any specific type of machine learning model for machine learning model 326 and any suitable machine learning model may be utilized.

Figure 8:
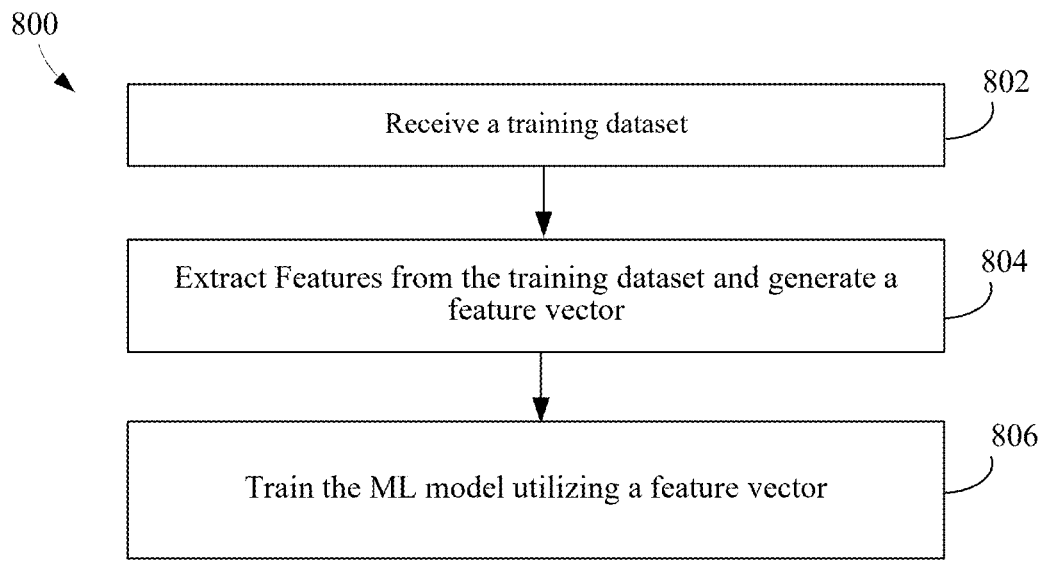
FIG. 8 is a flowchart for training a machine learning models for identifying a graph type, for generating an automated descriptive insight report, and for filtering insights for inclusion in a report, according to an example embodiment.

Computing device 102 or another computing device may operate in various ways to perform functions of system 700. For example, FIG. 8 is a flowchart for training machine learning models for identifying a graph type, for generating an automated descriptive insight report, and for filtering insights for inclusion in a report, according to an example embodiment. Note that the steps of flowchart 800 may be performed in an order different than shown in FIG. 8 in some embodiments. Furthermore, not all steps of flowchart 800 need to be performed in all embodiments. The steps of flowchart 800 are described with reference to FIGS. 7, 2A, and 3.

In step 802, feature set extractor 704 receives training dataset 702 (e.g., digital visual graph images and corresponding labels, descriptive insight reports and corresponding labels, or filtered insights).

In step 804, feature set extractor 704, extracts features from training dataset 702 and generates a feature vector based on the extracted features.

In step 806, machine model builder 706 trains an untrained machine learning model (e.g., a neural network model, a deep neural network model, or a clustering model) utilizing the feature vector to generate a trained machine learning model.

Figure 9:
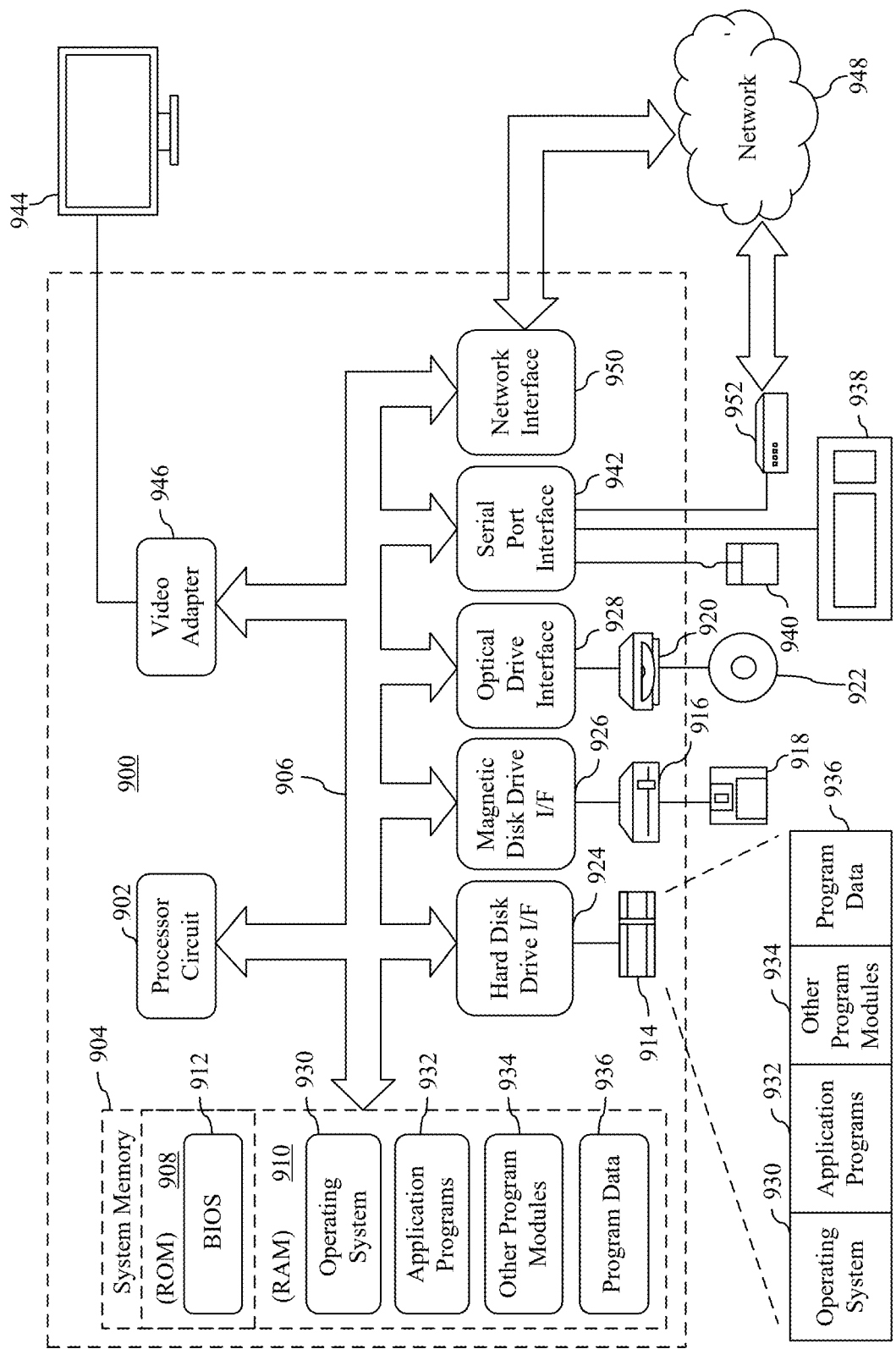
FIG. 9 is a block diagram of an example processor-based computer system that may be used to implement various embodiments.

FIG. 9 is a block diagram of an example processor-based computer system that may be used to implement various embodiments. Computing devices 102 and 710 may each include any type of computing device, mobile or stationary, such as a desktop computer, a server, a video game console, etc. For example, any of computing devices 102 and 710 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™ Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

FIG. 9 depicts an exemplary implementation of a computing device 900 in which embodiments may be implemented. For example, computing device 102 and computing device 710 may each be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing computing device 102, computing device 710, digital visual graph source 126, structured dataset source 122, digital visual graph to structured dataset converter 106, descriptive insight generator 108, descriptive insight report generator 110, text converter 114, speaker 116, user interface 118, graph type identifier 202, trained machine learning model 204, text extractor 206, text locator 208, text recognizer 210, parameter type identifier 212, structured dataset generator 214, visual image scanner 216, parameter attribute detector 302, data transformer 304, input data transformer 306, output data transformer 308, data relationship transformer 310, rules fired with data engine 318, rules engine 316, rules storage 314, descriptive insight templates storage 312, descriptive insights storage 320, trained machine learning model 322, descriptive insight filter 324, trained machine learning model 326, feature set extractor 704, machine learning model builder 706, and/or further embodiments described herein. Program data 936 may include structured dataset 120, digital visual graph 124, automated insight reports 112, rules stored in rules storage 314, descriptive insight reports stored in descriptive insight templates storage 312, descriptive insights stored in descriptive insights storage 320, automated descriptive insight listing 330, training dataset 710, and/or further embodiments described herein.

A user may enter commands and information into computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media).

Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

III. Additional Example Embodiments

In an embodiment, a system comprises: one or more processors; one or more memory devices that store program code to be executed by the one or more processors, the program code comprising: a digital visual graph to dataset converter configured to convert a digital visual graph into a structured dataset comprising data elements corresponding to the digital visual graph; a parameter attribute detector configured to detect an attribute for each respective data element of the structured dataset; a data transformer configured to encode a parameter name for each respective data element of the structured dataset, wherein each of the encoded parameter names indicates the detected attribute for the respective data element of the structured dataset; a descriptive insight generator configured to identify relationships among the data elements of the structured dataset based on the encoded parameter name and content of each respective data element of the structured dataset, evaluate the identified relationships based on domain knowledge, and generate descriptive insights for the structured dataset based on the evaluation of the identified relationships; a descriptive insight report generator configured to generate an automated descriptive insight report for the digital visual graph based on the generated descriptive insights; and a text converter configured to convert digital content of the automated descriptive insight report to a form suited for perception by a visually impaired user.

In an embodiment, the digital visual graph to dataset converter comprises: a trained machine learning model configured to identify a type of the digital visual graph; a text extractor configured to extract text elements in the digital visual graph; a text locator configured to locate each of the text elements relative to a coordinate system for the digital visual graph; a text recognizer configured to recognize the text elements; a parameter type identifier configured to identify a parameter type of each of the text elements; a visual image scanner configured to scan the digital visual graph horizontally and vertically based on the identified type of the digital visual graph and measure a magnitude and location of output data illustrated in the digital visual graph relative to the coordinate system; and a structured dataset generator configured to generate the structured dataset by associating the text elements, the location of each of the text elements relative to the coordinate system, the parameter type of each of the text elements, and the magnitude and location of the output data relative to the coordinate system.

In an embodiment, the trained machine learning model is trained utilizing bar graphs, line graphs, or pie charts and respective bar graph, line graph, and pie chart type identifiers.

In an embodiment, the parameter type identifier is configured to identify the parameter type of each of the text elements based on attributes of the text elements and the locations of the text elements relative to the coordinate system.

In an embodiment, the descriptive insight report generator comprises a trained machine learning module that is trained utilizing known descriptive insights and corresponding known descriptive insight reports, text, and documents.

In an embodiment, the program code further comprises: a rules engine configured to select a descriptive insight report template for the structured dataset based on content of the generated descriptive insights and a rule; and the descriptive insight report generator is configured to generate the automated descriptive insight report for the digital visual graph based on the generated descriptive insights by applying the generated descriptive insights to the selected descriptive insight report template.

In an embodiment, the program code further comprises: a descriptive insight filter configured to filter, with a trained machine learning model, the generated descriptive insights to reduce the number of descriptive insights included in the automated descriptive insight report, wherein the trained machine learning model utilizes clustering.

In an embodiment, the parameter attribute detector is configured to detect the attribute for each respective data element of the structured dataset by one or more of: determining a data type attribute of a respective data element of the structured dataset; or determining, for a respective data element of the structured dataset, whether the data element is an independent variable or a dependent variable.

In an embodiment, a method executed by one or more computing devices, comprises: converting a digital visual graph into a structured dataset comprising data elements corresponding to the digital visual graph; detecting an attribute for each respective data element of the structured dataset; generating an encoded parameter name for each respective data element of the structured dataset, wherein each of the encoded parameter names indicates the detected attribute for the respective data element of the structured dataset; identifying relationships among the data elements of the structured dataset based on the encoded parameter name and content of each respective data element of the structured dataset; evaluating the identified relationships based on domain knowledge; generating descriptive insights for the structured dataset based on the evaluation of the identified relationships; and generating an automated descriptive insight report for the digital visual graph based on the generated descriptive insights.

In an embodiment, converting the digital visual graph into the structured dataset comprises: identifying a type of the digital visual graph with a trained machine learning model; extracting text elements in the digital visual graph; locating each of the text elements relative to a coordinate system for the digital visual graph; recognizing the text elements; identifying a parameter type of each of the text elements; scanning the digital visual graph horizontally and vertically based on the identified type of the digital visual graph to measure a magnitude and location of output data illustrated in the digital visual graph relative to the coordinate system; and generating the structured dataset by associating the text elements, the location of each of the text elements relative to the coordinate system, the parameter type of each of the text elements, and the magnitude and location of the output relative to the coordinate system.

In an embodiment, the trained machine learning model is trained utilizing bar graphs, line graphs, or pie charts and respective bar graph, line graph, and pie chart type identifiers.

In an embodiment, identifying the parameter type of each of the text elements comprises: identifying the parameter type of each of the text elements based on attributes of the text elements and the locations of the text elements relative to the coordinate system.

In an embodiment, generating the automated descriptive insight report for the digital visual graph based on the generated descriptive insights comprises: generating the automated descriptive insight report utilizing a trained machine learning model, wherein the trained machine learning model is trained utilizing known descriptive insights and corresponding known descriptive insight reports, text, and documents.

In an embodiment, the method further comprises: selecting a descriptive insight report template for the structured dataset based on content of the generated descriptive insights and a rule; and generating the automated descriptive insight report for the digital visual graph based on the generated descriptive insights comprises applying the generated descriptive insights to the selected descriptive insight report template.

In an embodiment, the method further comprises: filtering, with a trained machine learning model, the generated descriptive insights to reduce the number of descriptive insights included in the automated descriptive insight report, wherein the trained machine learning model utilizes clustering.

In an embodiment, the method further comprises: converting digital content of the automated descriptive insight report to a form suited for perception by a visually impaired user.

In an embodiment, detecting the attribute for each respective data element of the structured dataset comprises one or more of: determining a data type attribute of a respective data element of the structured dataset; or determining, for a respective data element of the structured dataset, whether the data element is an independent variable or a dependent variable.

In an embodiment, a method executed by one or more computing devices comprises: receiving a structured dataset; detecting an attribute for each respective data element of the structured dataset; generating an encoded parameter name for each respective data element of the structured dataset, wherein each of the encoded parameter names indicates the detected attribute for the respective data element of the structured dataset; identifying relationships among the data elements of the structured dataset based on the encoded parameter name and content of each respective data element of the structured dataset; evaluating the identified relationships based on domain knowledge; generating descriptive insights for the structured dataset based on the evaluation of the identified relationships; and generating an automated descriptive insight report for the structured dataset based on the generated descriptive insights.

In an embodiment, receiving the structured dataset comprises: receiving a digital visual graph; identifying a type of the digital visual graph with a trained machine learning model; extracting text elements in the digital visual graph; locating each of the text elements relative to a coordinate system for the digital visual graph; recognizing the text elements; identifying a parameter type of each of the text elements; scanning the digital visual graph horizontally and vertically based on the identified type of the digital visual graph to measure a magnitude and location of output data illustrated in the digital visual graph relative to the coordinate system; and generating the structured dataset comprising data elements corresponding to the digital visual graph by associating the text elements, the location of each of the text elements relative to the coordinate system, the parameter type of each of the text elements, the magnitude and location of the output relative to the coordinate system.

In an embodiment, the method further comprises selecting a descriptive insight report template for the structured dataset based on content of the generated descriptive insights and a rule; and generating the automated descriptive insight report for the structured dataset based on the generated descriptive insights comprises applying the generated descriptive insights to the selected descriptive insight report template.

IV. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:
1. A system, comprising:
one or more processors;
one or more memory devices that store program code to be executed by the one or more processors, the program code comprising:
 a digital visual graph to dataset converter configured to convert a digital visual graph into a structured dataset arranged in a tabular format, the tabular format comprising values associated with each of an input parameter and corresponding output parameters of the digital visual graph, wherein the digital visual graph to dataset converter is configured to detect pixel positions representative of a magnitude of the corresponding output parameter within the digital visual graph;
 a parameter attribute detector configured to detect a first attribute for the input parameter and a second attribute for the output parameters, wherein the first attribute is different from the second attribute;
 a data transformer configured to encode a parameter name for each of the input parameter and the output parameters, wherein each encoded parameter name indicates the first attribute or the second attribute;
 a descriptive insight generator configured to:
  identify relationships among the output parameters based on the encoded parameter name and the values associated with each of the output parameters;

evaluate the identified relationships based on domain knowledge that corresponds to at least one topic or area of knowledge associated with the structured dataset, wherein the evaluating determines a relevance of the identified relationships within a context of the domain knowledge, the relevance indicating an importance of the identified relationships or indicating whether the identified relationships are a favorable outcome or an unfavorable outcome; and generate descriptive insights for the structured dataset based on the evaluation of the identified relationships, the descriptive insights including an analysis of the relevance of the identified relationships;

a descriptive insight report generator configured to generate an automated descriptive insight report for the digital visual graph based on the generated descriptive insights, the descriptive insight report including the analysis of the relevance of the identified relationships, wherein generating the automated descriptive insight report comprises using a first machine learning model to:

determine a report style to apply to the automated descriptive insight report based on a type of the automated descriptive insight report; and insert the descriptive insights into designated sections of the automated descriptive insight report; and a text converter configured to convert digital content of the automated descriptive insight report to a form suited for perception by a visually impaired user.

2. The system of claim 1, wherein the digital visual graph to dataset converter comprises:

a second machine learning model configured to identify a type of the digital visual graph;

a text extractor configured to extract text elements in the digital visual graph;

a text locator configured to locate each of the text elements relative to a coordinate system for the digital visual graph;

a text recognizer configured to recognize the text elements;

a parameter type identifier configured to identify a parameter type of each of the text elements;

a visual image scanner configured to scan the digital visual graph horizontally and vertically based on the identified type of the digital visual graph and measure a magnitude and location of each of the output parameters of the digital visual graph relative to the coordinate system; and a structured dataset generator configured to generate the structured dataset by associating the text elements, the location of each of the text elements relative to the coordinate system, the parameter type of each of the text elements, and the magnitude and location of each of the output parameters relative to the coordinate system.

3. The system of claim 2, wherein the second machine learning model is trained utilizing bar graphs, line graphs, or pie charts and respective bar graph, line graph, and pie chart type identifiers.

4. The system of claim 2, wherein the parameter type identifier is configured to identify the parameter type of each of the text elements based on attributes of the text elements and the locations of the text elements relative to the coordinate system.

5. The system of claim 1, wherein the first machine learning module is trained utilizing known descriptive insights and corresponding known descriptive insight reports, text, and documents.

6. The system of claim 1, wherein the program code further comprises:

a rules engine configured to select a descriptive insight report template for the structured dataset based on content of the generated descriptive insights and a rule; and wherein the descriptive insight report generator is configured to generate the automated descriptive insight report for the digital visual graph based on the generated descriptive insights by applying the generated descriptive insights to the selected descriptive insight report template.

7. The system of claim 1, wherein the program code further comprises:

a descriptive insight filter configured to cluster the generated descriptive insights using an unsupervised clustering algorithm and filter the generated descriptive insights based on results of the clustering to reduce a number of descriptive insights included in the automated descriptive insight report.

8. The system of claim 1, wherein the parameter attribute detector is configured to detect the attribute for each of the input parameter and the output parameters by one or more of:

determining a data type attribute of a value of the input parameter or the output parameter in the structured dataset; or determining, for the input parameter or the output parameter, whether the input parameter or the output parameter is an independent variable or a dependent variable.

9. A method executed by one or more computing devices, comprising:

converting a digital visual graph into a structured dataset arranged in a tabular format, the tabular format comprising values associated with each of an input parameter and corresponding output parameters of the digital visual graph, wherein the converting comprises detecting pixel positions representative of a magnitude of the corresponding output parameters within the digital visual graph;

detecting a first attribute for the input parameter and at least one second attribute for the output parameters, wherein the first attribute is different from the at least one second attribute;

determining a first parameter type for the input parameter and at least one second parameter type for the output parameters, wherein the first parameter type is different from the at least one second parameter type;

generating a first encoded parameter name for the input parameter based on the first parameter type, wherein the first encoded parameter name indicates the first attribute;

generating at least one second encoded parameter name for the output parameters based on the at least one second parameter type, wherein the at least one second encoded parameter name indicates the at least one second attribute;

identifying relationships among the output parameters based on the at least one second encoded parameter name and the values associated with each of the output parameters;

evaluating the identified relationships based on domain knowledge that corresponds to at least one topic or area of knowledge, wherein the evaluating determines relevances of the identified relationships, the relevances indicating an importance of the identified relationships within a context of the domain knowledge;

generating descriptive insights for the structured dataset based on the evaluation of the identified relationships, wherein each descriptive insight of the descriptive insights:
- includes a description of an individual relevance of the relevances for at least one identified relationship of the identified relationships; and
- is ranked within the descriptive insights based on the individual relevance; and generating an automated descriptive insight report for the digital visual graph based on the generated descriptive insights, wherein generating the automated descriptive insight report comprises using a first machine learning model that is based on a clustering algorithm or a neural network algorithm to:
- determine a report style to apply to the automated descriptive insight report based on a type of the automated descriptive insight report; and
- insert the descriptive insights into designated sections of the automated descriptive insight report.

10. The method of claim 9, wherein converting the digital visual graph into the structured dataset comprises:
identifying a type of the digital visual graph with a trained machine learning model;
extracting text elements in the digital visual graph;
locating each of the text elements relative to a coordinate system for the digital visual graph;
recognizing the text elements;
identifying a parameter type of each of the text elements;
scanning the digital visual graph horizontally and vertically based on the identified type of the digital visual graph to measure a magnitude and location of each of the output parameters of the digital visual graph relative to the coordinate system; and
generating the structured dataset by associating the text elements, the location of each of the text elements relative to the coordinate system, the parameter type of each of the text elements, and the magnitude and location of each of the output parameters relative to the coordinate system.

11. The method of claim 10, wherein identifying the parameter type of each of the text elements comprises:
identifying the parameter type of each of the text elements based on attributes of the text elements and the locations of the text elements relative to the coordinate system.

12. The method of claim 9, further comprising:
selecting a descriptive insight report template for the structured dataset based on content of the generated descriptive insights and a rule; and
wherein generating the automated descriptive insight report for the digital visual graph based on the generated descriptive insights comprises applying the generated descriptive insights to the selected descriptive insight report template.

13. The method of claim 9, further comprising:
clustering the generated descriptive insights using an unsupervised clustering algorithm and filtering the generated descriptive insights based on results of the clustering to reduce a number of descriptive insights included in the automated descriptive insight report.

14. The method of claim 9, further comprising:
converting digital content of the automated descriptive insight report to a form suited for perception by a visually impaired user.

15. The method of claim 9, wherein detecting the attribute for each of the input parameter and the output parameters comprises one or more of:
determining a data type attribute of a value of the input parameter or the output parameter in the structured dataset; or
determining, for the input parameter or the output parameter, whether the input parameter or the output parameter is an independent variable or a dependent variable.

16. The method of claim 9, wherein the machine learning model is trained using images of at least one of:
types of descriptive insight reports and corresponding labels for the types of descriptive insight reports; or
styles of descriptive insight reports and corresponding labels for the styles of descriptive insight reports.

17. A device comprising:
a processor; and memory comprising computer executable instructions that, when executed, perform operations comprising:
receiving a structured dataset arranged in a tabular format, the tabular format comprising values associated with each of an input parameter and corresponding output parameters;
detecting a first attribute for the input parameter and at least one second attribute for the output parameters;
determining a first parameter type for the input parameter and at least one second parameter type for the output parameters, wherein the first parameter type is different from the at least one second parameter type;
generating a first encoded parameter name for the input parameter based on the first parameter type, wherein the first encoded parameter name indicates the first attribute;
generating at least one second encoded parameter name for the output parameters based on the at least one second parameter type, wherein the at least one second encoded parameter name indicates the at least one second attribute;
identifying relationships among the output parameters based on the at least one second encoded parameter name and the values associated with each of the output parameters;
evaluating the identified relationships based on domain knowledge that corresponds to at least one topic or area of knowledge indicated by at least one of the input parameters or the output parameter, wherein the evaluating determines a relevance of the identified relationships, the relevance indicating whether the identified relationships are at least one of a favorable outcome or an unfavorable outcome within a context of the domain knowledge;
generating descriptive insights for the structured dataset based on the evaluation of the identified relationships, wherein each descriptive insight:
includes a description of an individual relevance of the relevances for at least one identified relationship of the identified relationships; and
is ranked within the descriptive insights based on the individual relevance;
and
generating an automated descriptive insight report for the structured dataset based on the generated descriptive insights, wherein generating the automated descriptive insight report comprises using a first machine learning model that is based on a clustering algorithm or a neural network algorithm to:

determine a report style to apply to the automated descriptive insight report based on a type of the automated descriptive insight report;

and insert the descriptive insights into designated sections of the automated descriptive insight report.

18. The device of claim 17, wherein receiving the structured dataset comprises:

receiving a digital visual graph;

identifying a type of the digital visual graph with a trained machine learning model based on a graphical construction of the digital visual graph;

extracting text elements in the digital visual graph by converting at least a portion of the digital visual graph into a text-based format;

locating each of the text elements relative to a coordinate system for the digital visual graph, the coordinate system indicating pixel coordinates of the text elements;

recognizing the text elements by comparing the text elements to one or more domain areas of domain knowledge;

identifying a parameter type of each of the text elements based on the domain knowledge;

scanning, using an image scanner module implemented by a structured dataset generator, the digital visual graph horizontally and vertically based on the identified type of the digital visual graph to measure a magnitude and location of each of the output parameters of the digital visual graph relative to the coordinate system, wherein different types of the digital visual graph are scanned differently; and generating, by the structured dataset generator, the structured dataset comprising data elements corresponding to the digital visual graph by associating the text elements, the location of each of the text elements relative to the coordinate system, the parameter type of each of the text elements, and the magnitude and location of each of the output parameters relative to the coordinate system.

19. The device of claim 17, wherein determining whether the identified relationships indicate a favorable outcome or an unfavorable outcome comprises:

determining a category type for the input parameter and the output parameters;

determining the context of the domain knowledge based on the category type;

using the context of the domain knowledge to determine whether each of the identified relationships indicates the favorable outcome or the unfavorable outcome; and providing an indication of whether one or more of the identified relationships indicates the favorable outcome or the unfavorable outcome in the automated descriptive insight report.

20. The device of claim 17, wherein at least one relationship in the identified relationships represents a favorable outcome in a first context of first domain knowledge and represents an unfavorable outcome in a second context of second domain knowledge.

* * * * *